US012275626B2

(12) United States Patent
Sinnema et al.

(10) Patent No.: US 12,275,626 B2
(45) Date of Patent: Apr. 15, 2025

(54) SELF-ACTUATING MECHANICALLY-BIASED CONTAINER RESTRAINT

(71) Applicant: BD KIESTRA B.V., Drachten (NL)

(72) Inventors: Jurjen Sinnema, Joure (NL); Franciscus Feijen, Leeuwarden (NL)

(73) Assignee: BD KIESTRA B.V., Drachten (NL)

( * ) Notice: Subject to any disclaimer, the term of this patent is extended or adjusted under 35 U.S.C. 154(b) by 0 days.

(21) Appl. No.: 18/658,430

(22) Filed: May 8, 2024

(65) Prior Publication Data

US 2024/0383736 A1 Nov. 21, 2024

Related U.S. Application Data

(63) Continuation of application No. 17/288,788, filed as application No. PCT/EP2019/079336 on Oct. 28, 2019, now Pat. No. 12,012,323.

(Continued)

(51) Int. Cl.
*B67B 3/20* (2006.01)
*B67B 7/18* (2006.01)

(52) U.S. Cl.
CPC ............ *B67B 3/206* (2013.01); *B67B 3/2066* (2013.01); *B67B 7/182* (2013.01)

(58) Field of Classification Search
CPC ....... B67B 3/206; B67B 3/2066; B67B 7/182; B67B 7/18; B67B 3/20
See application file for complete search history.

(56) References Cited

U.S. PATENT DOCUMENTS 1,249,025 A * 12/1917 Carvalho ................ B67B 7/182 279/38
3,848,485 A * 11/1974 Grenci .................... B25B 27/24 81/3.2

(Continued)

FOREIGN PATENT DOCUMENTS

EP 2502675 A1 9/2012
FR 2470084 A1 5/1981

(Continued)

OTHER PUBLICATIONS

Examination Report No. 1 issued in corresponding Australian Patent Application No. 2019370655 on Sep. 25, 2024, pp. 4.

(Continued)

*Primary Examiner* — Andrew M Tecco
*Assistant Examiner* — Nicholas E Igbokwe
(74) *Attorney, Agent, or Firm* — Botos Churchill IP Law LLP

(57) ABSTRACT

A system and method for a self-actuating, mechanically-biased container restraint. The system requires no computer-aided control or timing, nor is any external power source needed, other than the force exerted as a container is inserted into the restraint. The system relies upon an assembly including mechanically-biased pivoting levers, each of which has a horizontal element and a vertical element. All actuation occurs as the base of an inserted container comes into contact with the upper surface of the horizontal elements of multiple pivoted levers positioned at the base of a channel adapted to serve as a guide for the inserted tube. The levers are biased in this elevated position by mechanical means, such as a spring. As the inserted tube presses the horizontal members downward, the top portions of the vertical members are pivoted inward toward the container's exterior. Friction pads situated upon the interior surface of each vertical element are brought into contact with the exterior of the container, thereby gripping it. This gripping action holds the container with sufficient friction to permit the removal or attachment of a screw cap. Further embodiments of the invention include a mechanically biased platform supporting the channel and the pivoting levers. This base is biased and positioned to permit the channel and the pivoting lever assembly to be translated downward against the force biasing the platform and translate through the body of the container restraint. This further advancement of container, the channel and the lever assembly cause the pivoting levers to assume fully engaged gripping positions, and brings the vertical elements of the levers (and flexible friction pads upon them) into full upright positions. In this position the friction pads apply a maximum static friction force to the exterior of the container.

20 Claims, 37 Drawing Sheets

Related U.S. Application Data

(60) Provisional application No. 62/752,042, filed on Oct. 29, 2018.

(56) References Cited

U.S. PATENT DOCUMENTS

| | | | | |
|---|---|---|---|---|
| 6,205,888 | B1 * | 3/2001 | Laudani | B67B 7/18 269/254 R |
| 2005/0132845 | A1 * | 6/2005 | Chervak | B67B 7/182 81/3.32 |
| 2007/0107554 | A1 * | 5/2007 | Yeager | B67B 7/18 81/3.33 |
| 2015/0175398 | A1 * | 6/2015 | Christensen | B67B 3/2066 53/318 |
| 2022/0080605 | A1 * | 3/2022 | Iwasaki | B25J 9/0087 |

FOREIGN PATENT DOCUMENTS

| | | | |
|---|---|---|---|
| JP | 2004175415 | A | 6/2004 |
| JP | 5809821 | B2 | 11/2015 |
| JP | 6285698 | B2 | 2/2018 |
| RU | 2013147645 | A | 4/2015 |
| WO | 2019202078 | A1 | 10/2019 |

OTHER PUBLICATIONS

International Search Report and Written Opinion for corresponding International Application No. PCT/EP2019/079336 dated Feb. 3, 2020 (12 pages).
Office Action in corresponding Russian Patent Application No. 2021115052 dated Feb. 27, 2023 (19 pp.).
Office Action issued in corresponding European Patent Application No. 19795185.8 dated Sep. 14, 2022 (7 pp.).
Office Action issued in corresponding Indian Patent Application No. 202117023476 dated Nov. 11, 2022, (6 pp.).
Korean Office Action issued in corresponding KR application No. 10-2021-7016382 on Jun. 3, 2024.

* cited by examiner

SELF-ACTUATING MECHANICALLY-BIASED CONTAINER RESTRAINT

CROSS-REFERENCE TO RELATED APPLICATIONS

The present application is a continuation of U.S. application Ser. No. 17/288,788, filed Apr. 26, 2021, now allowed, which application is a national phase entry under 35 U.S.C. § 371 of International Application No. PCT/EP2019/079336 filed Oct. 28, 2019, published as International Publication No. WO 2020/089139 A1, which claims the benefit of the filing date of U.S. Provisional Application No. 62/752,042 filed Oct. 29, 2018, the disclosures of which is are hereby incorporated herein by reference.

TECHNICAL FIELD

This application relates to a system and method that facilitates the capping and decapping of containers. In particular, this patent application relates to physically securing containers so as to permit the removal and/or replacement of a container cap that is fastened and removed from the container by rotation.

BACKGROUND OF THE INVENTION

Specimen containers are used in laboratory environments for storing and transporting specimens to be tested. Specimen containers come in a variety of sizes depending on the characteristics or the amount of a specimen needing to be stored or transported. Industry standards may also dictate the type of container to be used for transporting a particular specimen. Multiple sizes of specimen containers may be delivered to a laboratory for specimen testing. The containers are typically sealed with a screw-on container cap. Therefore, testing specimens is typically a time-consuming and labor-intensive process, requiring removal of the cap, extraction of a specimen sample from the container, and re-installation of the cap.

Numerous automated systems for capping and decapping laboratory specimen containers are known in the art. These systems typically utilize rotary assemblies which grip either or both of the container body and container cap. The gripping mechanism must be capable of grasping the element (i.e. one of the cap or the container body) to be rotated with sufficient force to permit an effective amount of torque to be applied to securely fix, or effectively remove the cap from the container. The mechanism must also be capable of disengaging to release or eject the element after the capping/decapping procedure has been completed.

These capping/decapping systems may require the clamping or restraint of a specimen container body during the capping and decapping operation, so as to prohibit the container from rotating as torque is applied to the cap by a coupler assembly during the capping/decapping process. Prior art clamping systems have employed mechanical systems that engage/disengage the container in response to some external mechanical actuation (electric, pneumatic, hydraulic, etc.). This type of clamping system permits a specimen container to be restrained while a torque is applied to the associated cap, and released to allow unimpeded insertion, ejection and removal of the container from the clamping system. However, these systems require an electrical, pneumatic or hydraulic subsystem, and an associated control system that is either synchronized with the capping/decapping system, or adapted to sense and respond to the position or proximity of the capper/decapper coupler assembly. This would introduce additional complexity and cost to an automated capping/decapping system.

Consequently, there is a need for a mechanically-reliable, self-actuating specimen container restraint system and method, that is suitable for use with automated capping/decapping systems.

BRIEF SUMMARY OF THE INVENTION

A system and method for a self-actuating, mechanically-biased container restraint is described herein. The system requires no computer-aided control or timing, nor is any external power source needed, other than the force exerted as a container is inserted into the restraint. The system relies upon an assembly including one or more mechanically-biased pivoting levers, each of which has a horizontal element or arm and a vertical element or arm, each of which extends from a pivoting axis. "Horizontal" and "vertical" are used herein to describe the orientation of the lever arms with respect to each other and not in relation to another surface. The vertical lever arm extends upwardly from the pivot axis and the horizontal arm extends approximately laterally from the pivot axis. Said another way, the lever arms are approximately orthogonal to each other with respect to the pivot axis. One of ordinary skill will appreciate that the relative angles of the elements or arms may be less than or greater than ninety-degrees as long as the arms and their relative orientation serve to secure and release the container in cooperation with the mechanism or other means (i.e. manual operation) that is used to remove the cap from and secure the cap to the container. The lever(s) are disposed at the base of a channel in a housing.

The channel is adapted to receive a capped container. All actuation occurs as the base of an inserted container comes into contact with the upper surface of the horizontal elements of one or more pivoted levers positioned at the base of a channel adapted to serve as a guide for the inserted tube. The lever(s) are biased in this pivoted, elevated position by mechanical means, such as a spring. As the inserted tube presses the horizontal members downward, the top portions of the vertical members are pivoted inward toward the container's exterior. A friction pad situated upon the interior surface of each vertical element is brought into contact with the exterior of the container, thereby gripping it. This gripping action holds the container with sufficient friction to permit the removal or attachment of a screw cap. In the embodiment wherein there is only one lever, a friction pad is disposed on a surface of the channel opposite the vertical lever arm with the friction pad disposed thereon.

Further embodiments of the invention include a mechanically biased platform supporting the channel and the pivoting levers. This base is biased and positioned to permit the channel and the pivoting lever assembly to be translated downward against the force biasing the platform and translate through the body of the container restraint. This further advancement of container, the channel and the lever assembly cause the pivoting levers to assume fully engaged gripping positions, and brings the vertical elements of the levers (and flexible friction pads upon them) into full upright positions. In this position the friction pads apply a maximum static friction force to the exterior of the container. In a further embodiment, the channel in the housing receives a sleeve and the sleeve is advanced downward in the channel as the mechanically biased platform is urged away from the bottom of the housing in response to the downward force applied by the container to the lever(s) disposed at the bottom of the channel.

In one embodiment, the apparatus for mechanically constraining a container configured to accept a cap includes an assembly including a housing or block having a channel therein. In one embodiment, the channel has a movable sleeve disposed therein. The channel receives the container from its proximal end in the block. The channel has a length such that a portion of the container that receives the cap does not enter the channel. The apparatus also includes at least one lever positioned proximate to a distal end of the channel in the block. The at least one lever is pivotally attached to the block. The lever has a first portion that extends substantially radially with respect to the channel and a second portion that extends substantially axially relative to the channel. The first and second portions of the lever rotate with respect to an axis defined by the pivotal attachment of the lever to the block.

In one embodiment, the apparatus also includes a first mechanical bias connected to a movable lower plate such that the movable lower plate is biased to rest proximate to the distal end of the block with a first biasing force. In either the same or a different embodiment, the apparatus also includes a second mechanical bias adapted to position the at least one lever with a second biasing force that causes the substantially radial portion of the at least one lever to extend inwardly and upwardly into the channel and the substantially axial portion of the at least one lever to extend upwardly and outwardly with respect to a channel axis. In the embodiment where the apparatus includes both mechanically biased features, the first biasing force exceeds the second biasing force. In response to a downward force exerted on or by the container in the channel that exceeds the second biasing force of the second mechanical bias, the second mechanical bias is overcome and the lever pivots at a proximal end of the substantially radial portion and substantially axial portions of the lever such that a distal end of the substantially radial portion is urged downward in response to the downward force exerted on the container received by the channel and the distal end of the substantially axial portion is urged toward the container in the channel and further where, when the downward force exceeds the first biasing force, the movable lower plate is advanced from contact with the block, allowing the container to be advanced further into the channel thereby further advancing the distal end of the substantially radial portion of the lever lower and the distal end of the of the substantially axial portion of the lever further inward such that the distal end of the axial portion contacts the container with a static friction force ($F_s$).

In one embodiment, the first and second mechanical biases are provided by springs. One example of a container is a specimen tube. Such containers are often threaded to receive a screw cap. In a further embodiment the apparatus has two levers, where a first lever is pivotally attached to the block on one side of the channel and a second lever is pivotally attached to the block on the opposite side of the channel. Each lever also includes an anchor. The second mechanical bias is connected to each anchor. The apparatus also has one or more guide pins coupled to the movable lower plate, each guide pin disposed in a guide channel formed in the block.

In the embodiment in which the channel has a movable sleeve therein, the sleeve has a flange with an outer perimeter that extends beyond a perimeter of an opening in the block that receives the sleeve. The sleeve is movable within the block and the flange prevents the sleeve from being advanced beyond the proximal end of the block. The sleeve advances further into the opening of the block when the downward force exceeds the second mechanical bias because the sleeve advances with the movable lower plate when the plate is urged from contact with the block due to the downward force in excess of the first mechanical bias. The first mechanical bias is further connected to the block. The at least one lever further includes an anchor to which the second mechanical bias is attached. The substantially axial portion of the lever has a friction pad affixed thereto and where the friction pad is advanced into contact with the container with the static friction force ($F_s$).

Also described herein is a method for mechanically constraining a container using the apparatus. According to an uncapped end of the container is inserted into the proximal end of the sleeve having the channel therein. The container is urged into the channel with a force equal to or greater than the first biasing force so as to bring the uncapped end of the container into contact with the distal end of the substantially radial portion of the lever thereby causing the lever to pivot. The downward force also urges an inward-facing surface of the substantially axial portion of the lever into contact with the uncapped end of the container.

BRIEF DESCRIPTION OF THE DRAWINGS

The features, aspects, and advantages of the present invention will become better understood with regard to the following description, appended claims, and accompanying drawings in which:

DETAILED DESCRIPTION

The mechanically-biased container restraint of the present disclosure is adapted to be used in conjunction with an automated container capper/decapper system. To provide the proper context for describing the container restraint, a description of an exemplary capper/decapper system will be provided. The skilled person will understand and appreciate that the present invention might be used in conjunction with a variety of mechanical capper/decappers, whether automated or operated manually. The present invention can also be used to hold a container when a cap is removed manually.

Automated Capper/Decapper System

One such system, the subject of U.S. Provisional Patent Application 62/659,915, assigned to BD Kiestra B.V. of Drachten, Netherlands, from which PCT/EP2019/060083, filed Apr. 18, 2019 (published as WO2019/202078 A1 on Oct. 24, 2019), claims priority, provides a mechanism driven by a single bi-directional motor linked to a coupler assembly via a rotating threaded shaft. The coupler assembly is configured to engage with a cap via mechanically-biased splines. The system employs an impeller and an ejector, both of which are concentrically positioned about the threaded shaft. The impeller translates along the shaft as a function of the shaft's rotation, so as to permit the retraction of the ejector when an element is engaged in the coupler assembly, or cause the ejector to extend into the coupler assembly thereby disengaging the cap.

Figure 1A:
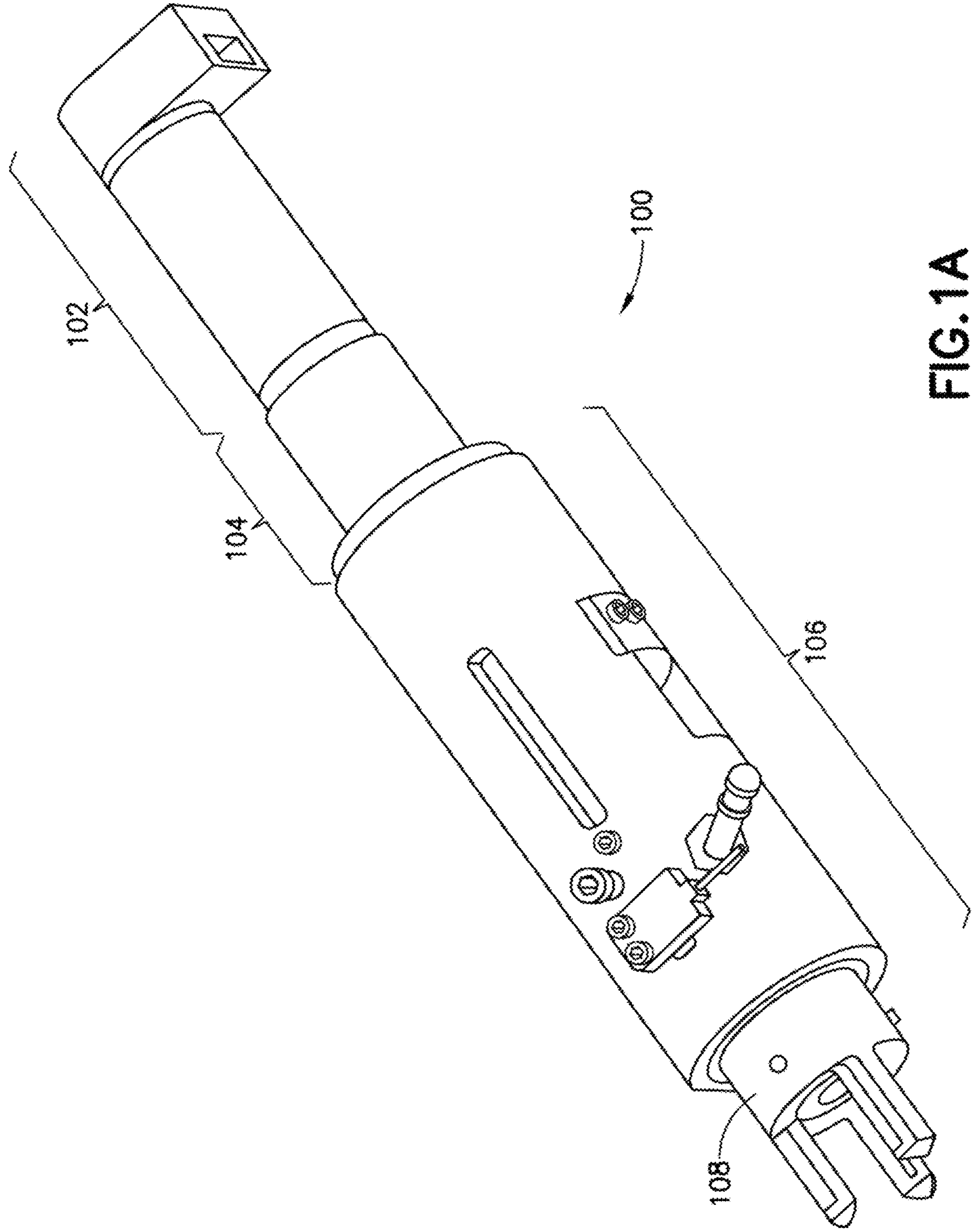
FIG. 1A is perspective view of a capper/decapper system in according to one embodiment of the present disclosure.
Figure 1B:
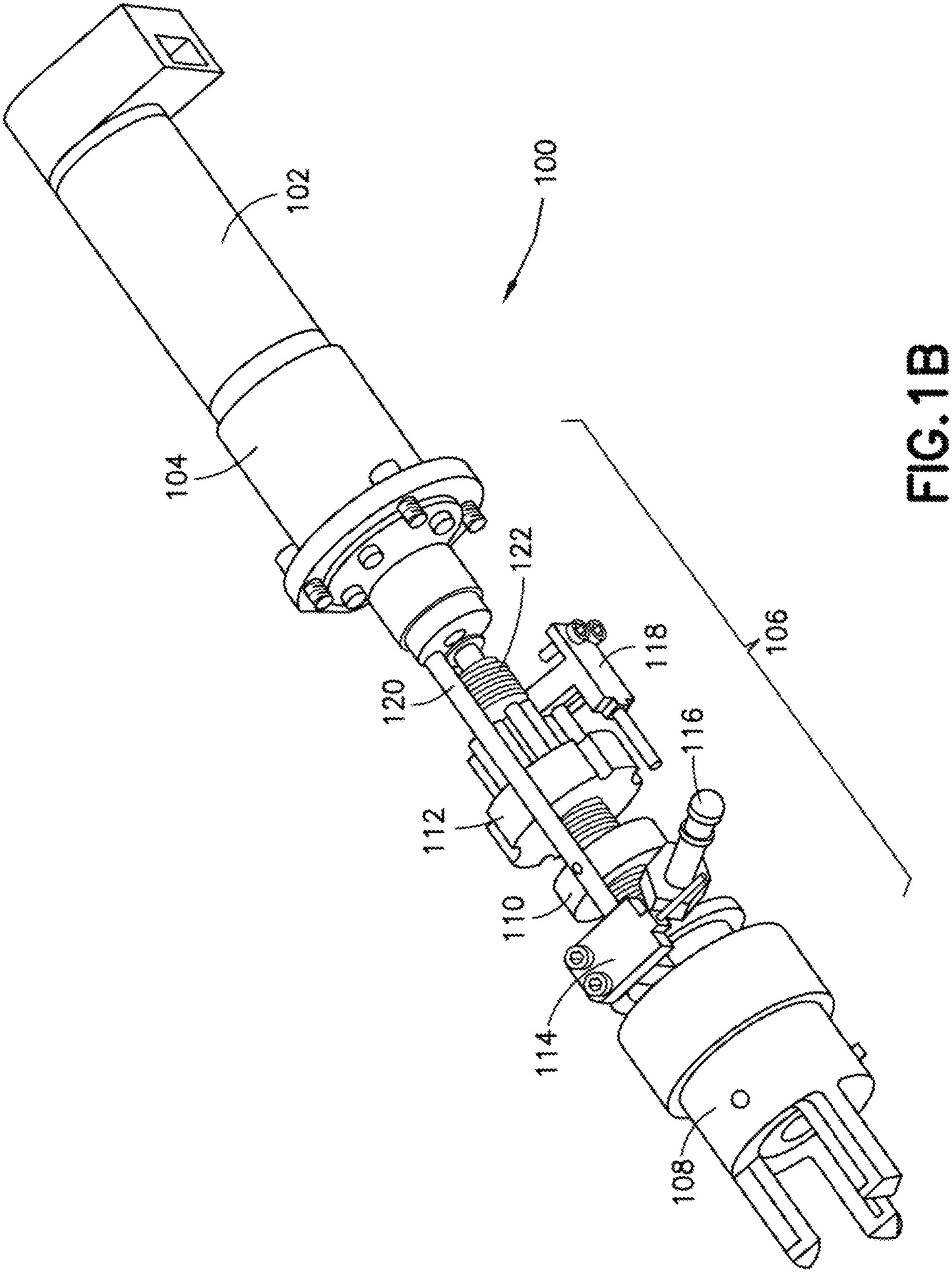
FIG. 1B is perspective view of a capper/decapper system of FIG. 1A depicting the driver mechanism components.

As shown in FIGS. 1A and 1B, motor 102 is coupled to driver assembly 106 by transmission 104, and driver assembly 106 is adjacent to coupler assembly 108. Driver assembly 106 includes ejector 110, impeller 112, coupler assembly sensor 114, ejector sensor 116, impeller sensor 118, impeller alignment shaft 120, and threaded drive shaft 122.

Figure 2B:
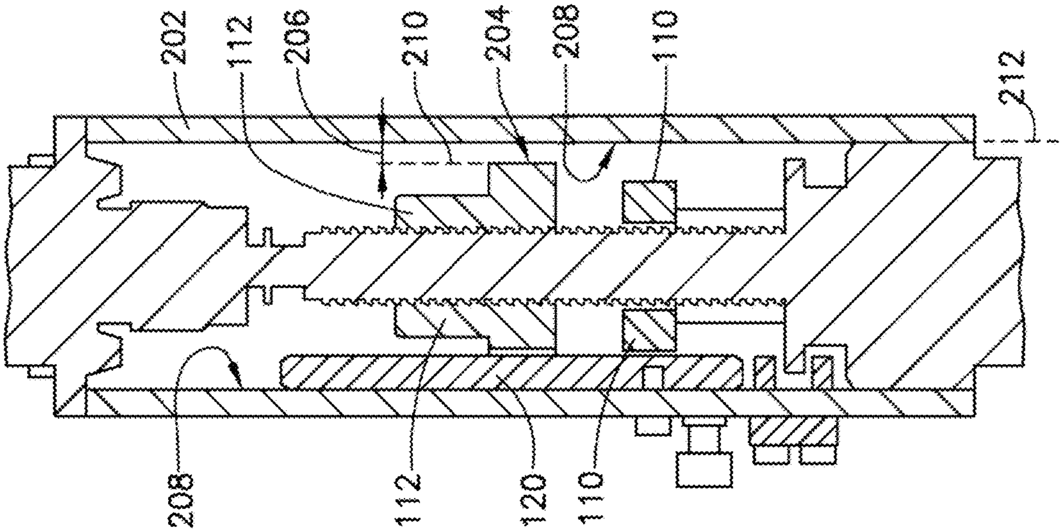
FIG. 2B is a partial cut-away side view of the driver mechanism of the capper/decapper system of FIG. 1B.
Figure 2A:
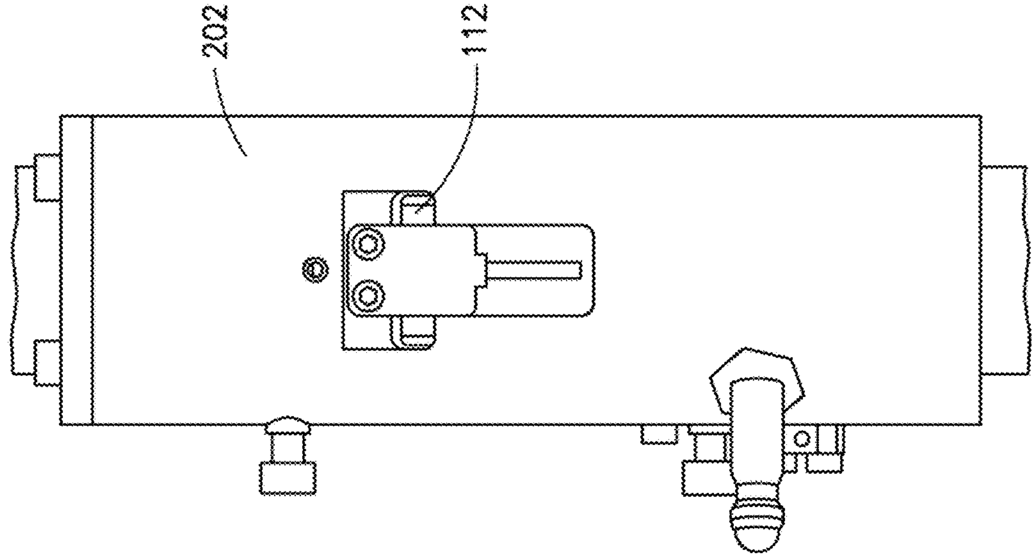
FIG. 2A is a side view of the driver mechanism of the capper/decapper system of FIG. 1B.
Figure 2C:
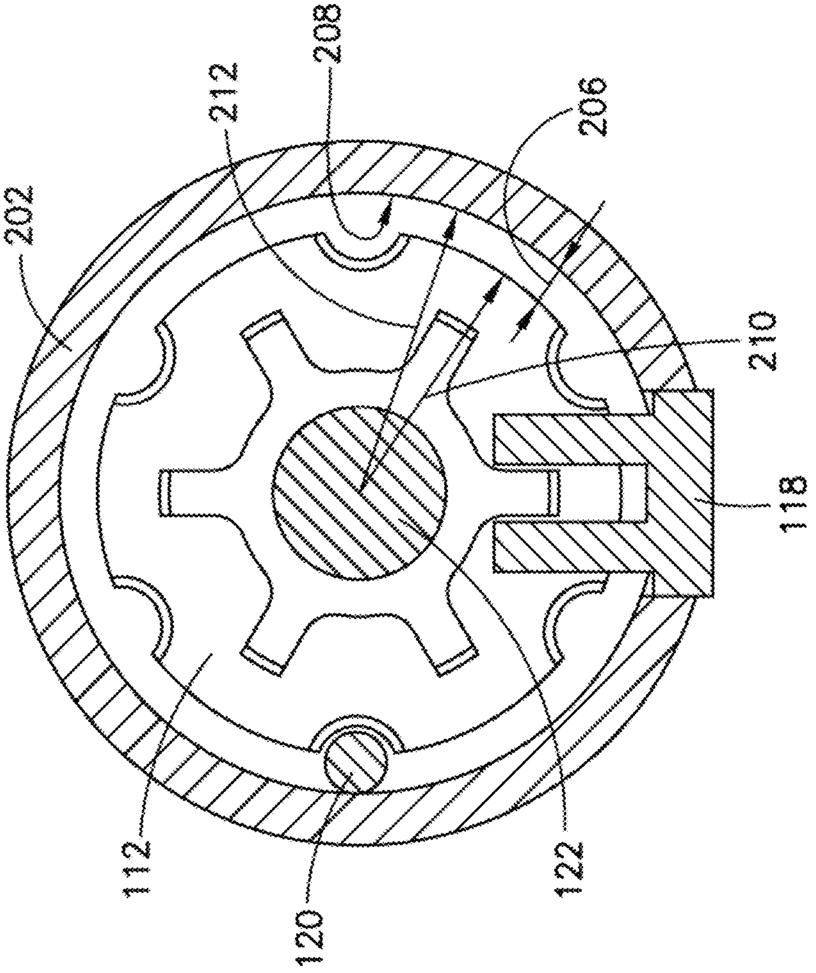
FIG. 2C is a partial cut-away top view of the driver mechanism of the capper/decapper system of FIG. 1B.
Figure 3A:
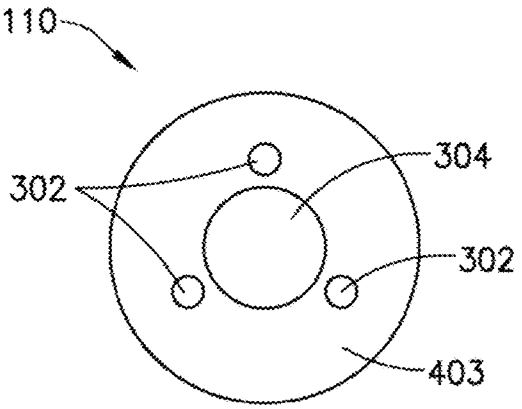
FIG. 3A, is the bottom view of the ejector of the capper/decapper system of FIG. 1B.
Figure 3B:
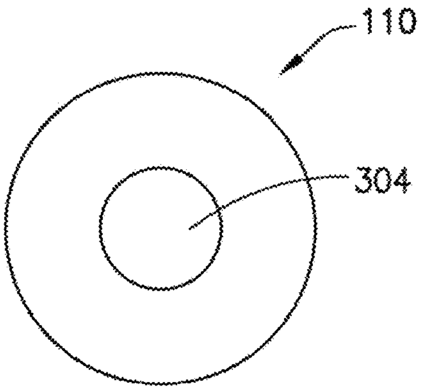
FIG. 3B, is the top view of the ejector of the capper/decapper system of FIG. 1B.
Figure 3C:
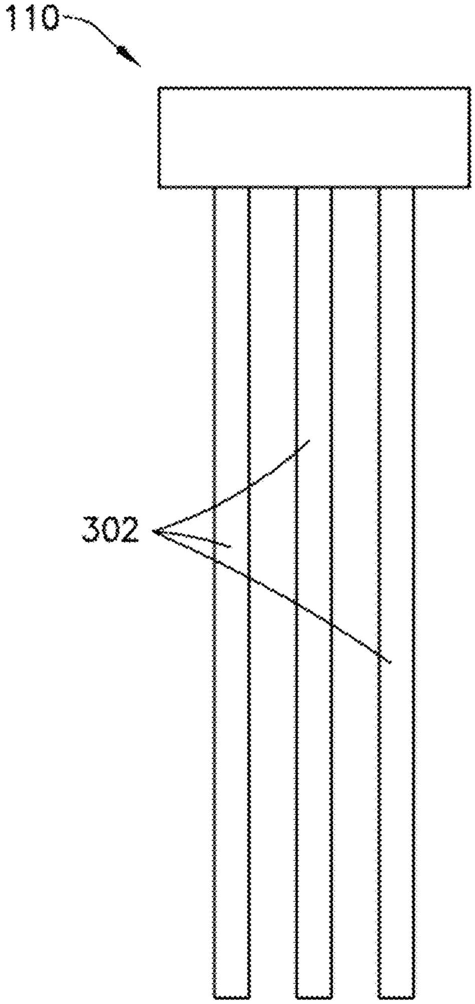
FIG. 3C is a side view of the ejector of the capper/decapper system of FIG. 1B.
Figure 3D:
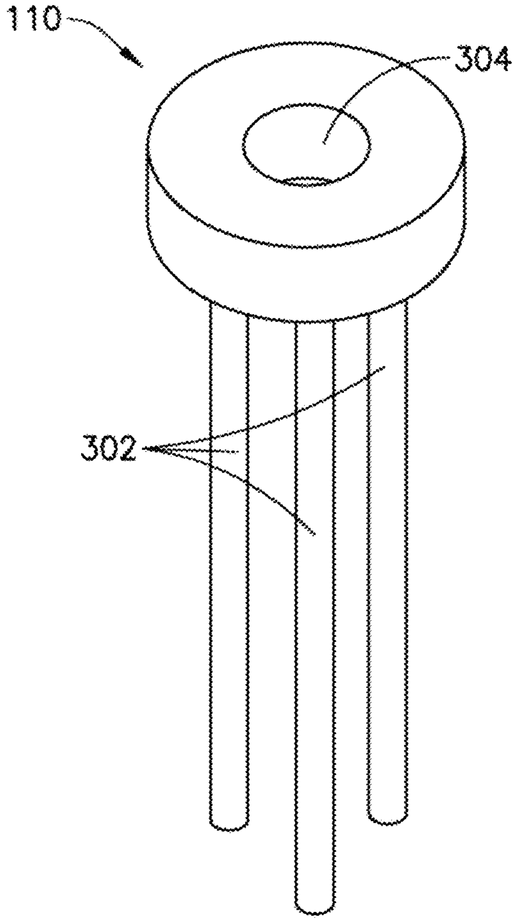
FIG. 3D is a perspective view of the ejector of the capper/decapper system of FIG. 1B.

FIGS. 2A, and 2B show a partial side view, and a partial cut-away side view, respectively, of driver mechanism 106. As illustrated in FIG. 3B, the outermost surface 204 of impeller 112 must be dimensioned so as to create a gap 206 between it and inner wall 208 of frame 202. This is further illustrated in FIG. 2C, which provides a top cut-away view of driver mechanism 106. As illustrated, the outermost radius 210 of impeller 112 is less than the inner radius 212 of frame 202. This creates gap 206 between impeller 112 and inner wall 208, which permits impeller 112 to translate along threaded shaft 122 as a function of the shaft's rotation (driven by transmission 104), unimpeded by impeller alignment shaft 120.

FIGS. 3A, 3B, 3C and 3D provide a bottom, top, side and perspective views of ejector 110. Ejector 110 is shown to have three elongated ejection rods 302 extending from the ejector's bottom surface. There is also a central, unthreaded channel 304.

Figure 4:
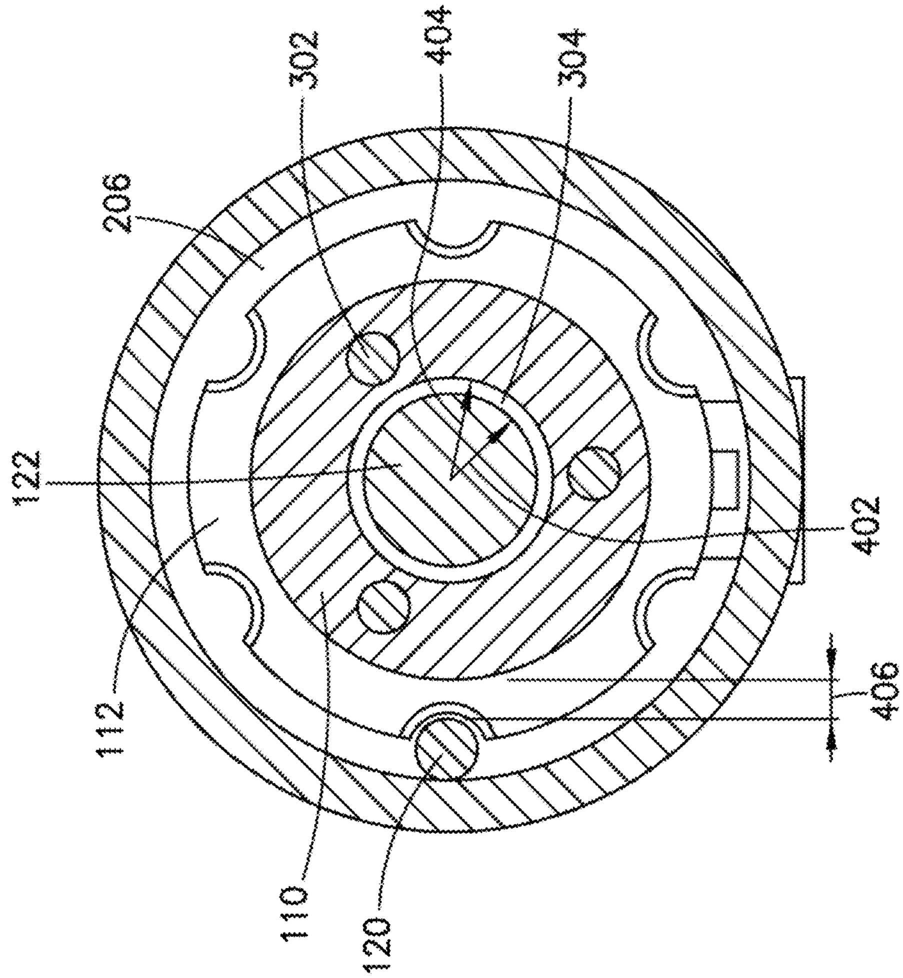
FIG. 4 is a partial cut-away bottom view of the driver mechanism of the capper/decapper system of FIG. 1B.

As shown in FIG. 4, the outermost radius 402 of threaded shaft 122 is less than the inner radius 404 of unthreaded channel 304. This ensures a gap exists between unthreaded channel 304 and the outermost surface of threaded shaft 122. This gap permits ejector 110 to translate along the longitudinal axis of threaded shaft 122, without being impeded by that shaft. FIG. 4 also shows the dimensional relationship between impeller alignment shaft 120 and ejector 110. The outer radius of ejector 110 must be limited to a dimension that ensures a gap 406 between ejector 110 and impeller alignment shaft 120, thereby enabling ejector 110 to translate along the longitudinal axis of threaded shaft 122, without impacting or otherwise contacting impeller alignment shaft 120.

Figure 5A:
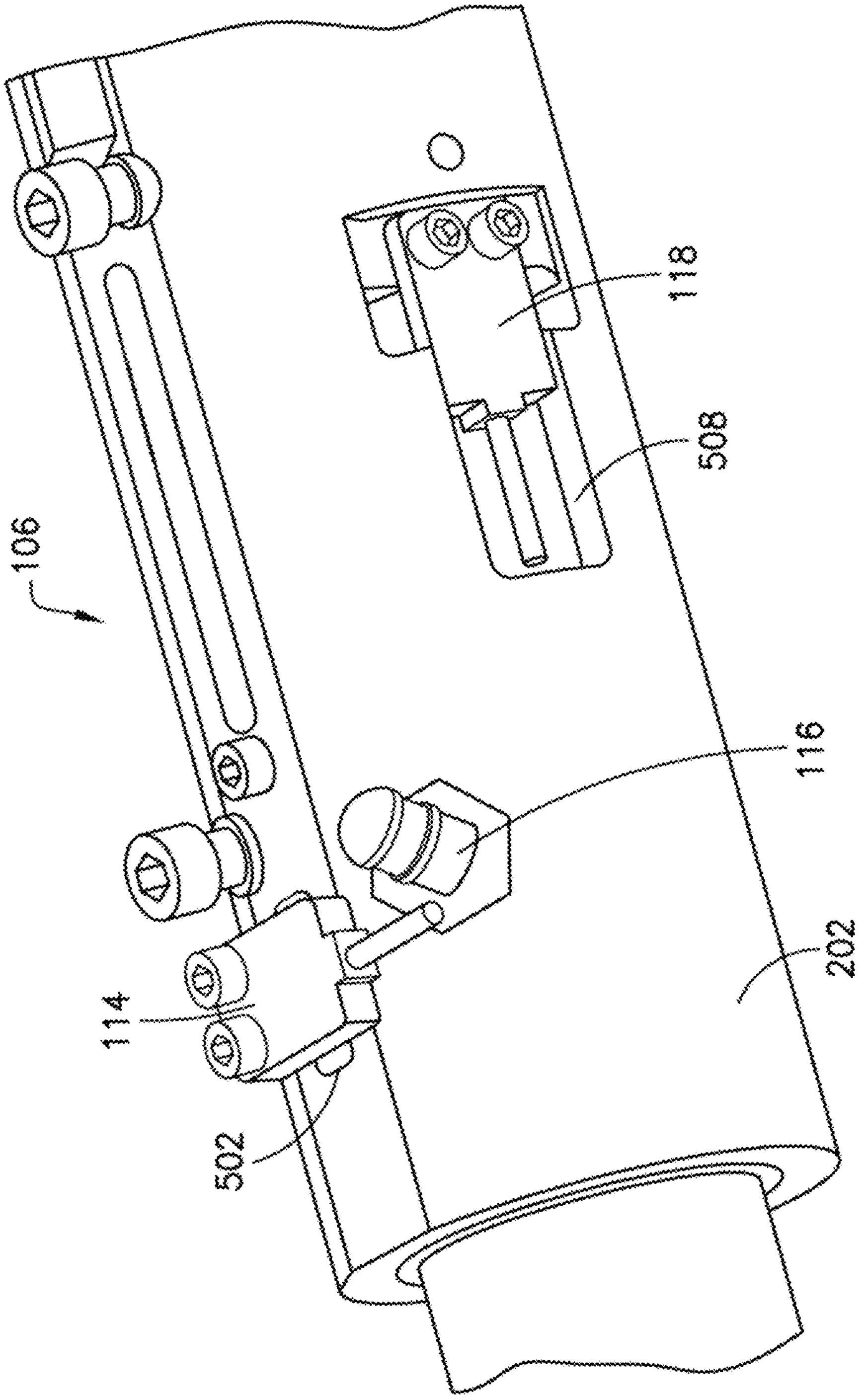
FIG. 5A is a perspective view of a coupler assembly position sensor, an ejector sensor and an impeller sensor mounter upon the driver mechanism of FIG. 1B.
Figure 5B:
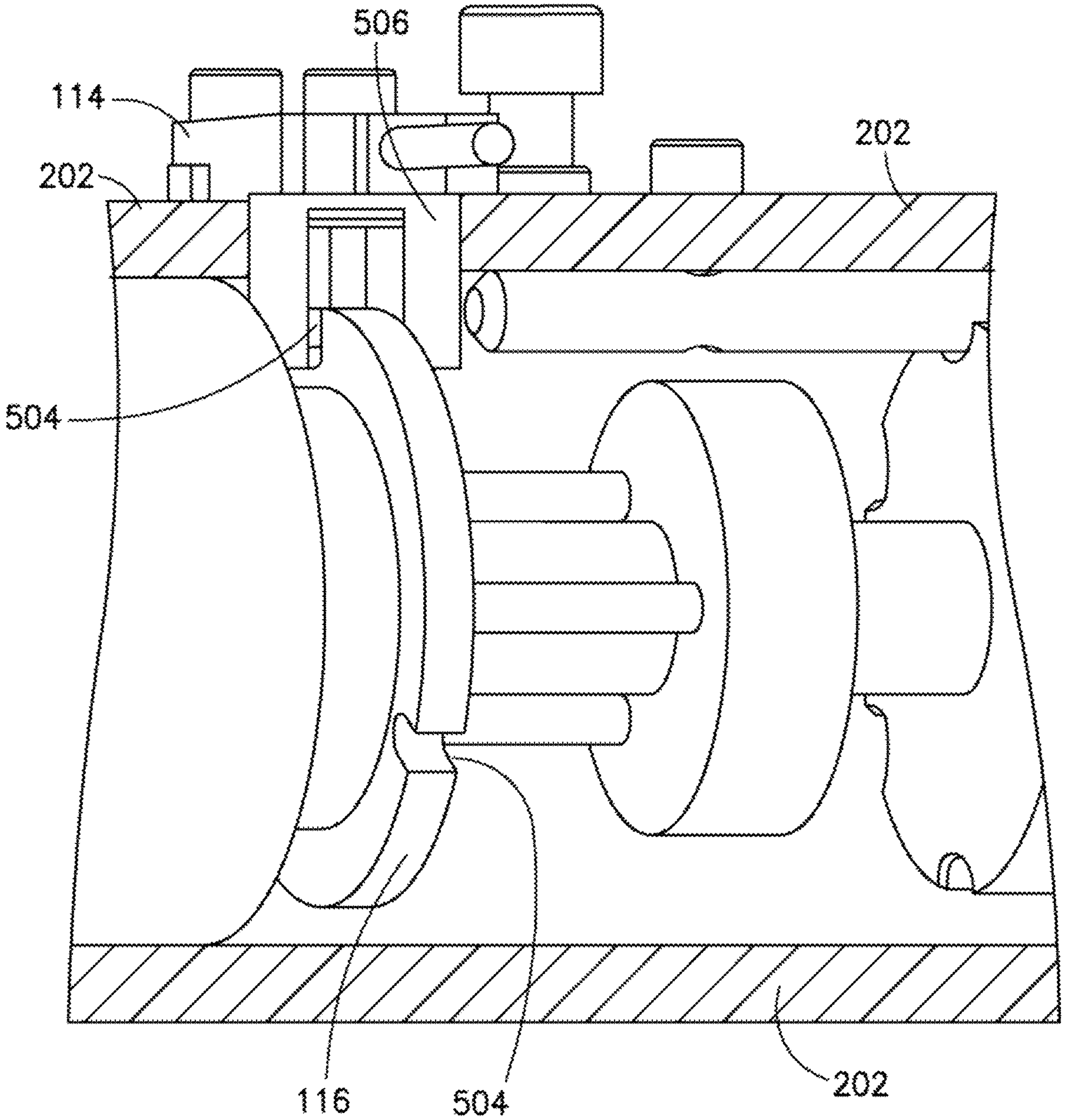
FIG. 5B is a partial cut-away perspective view showing the coupler assembly position sensor of FIG. 5A.
Figure 5C:
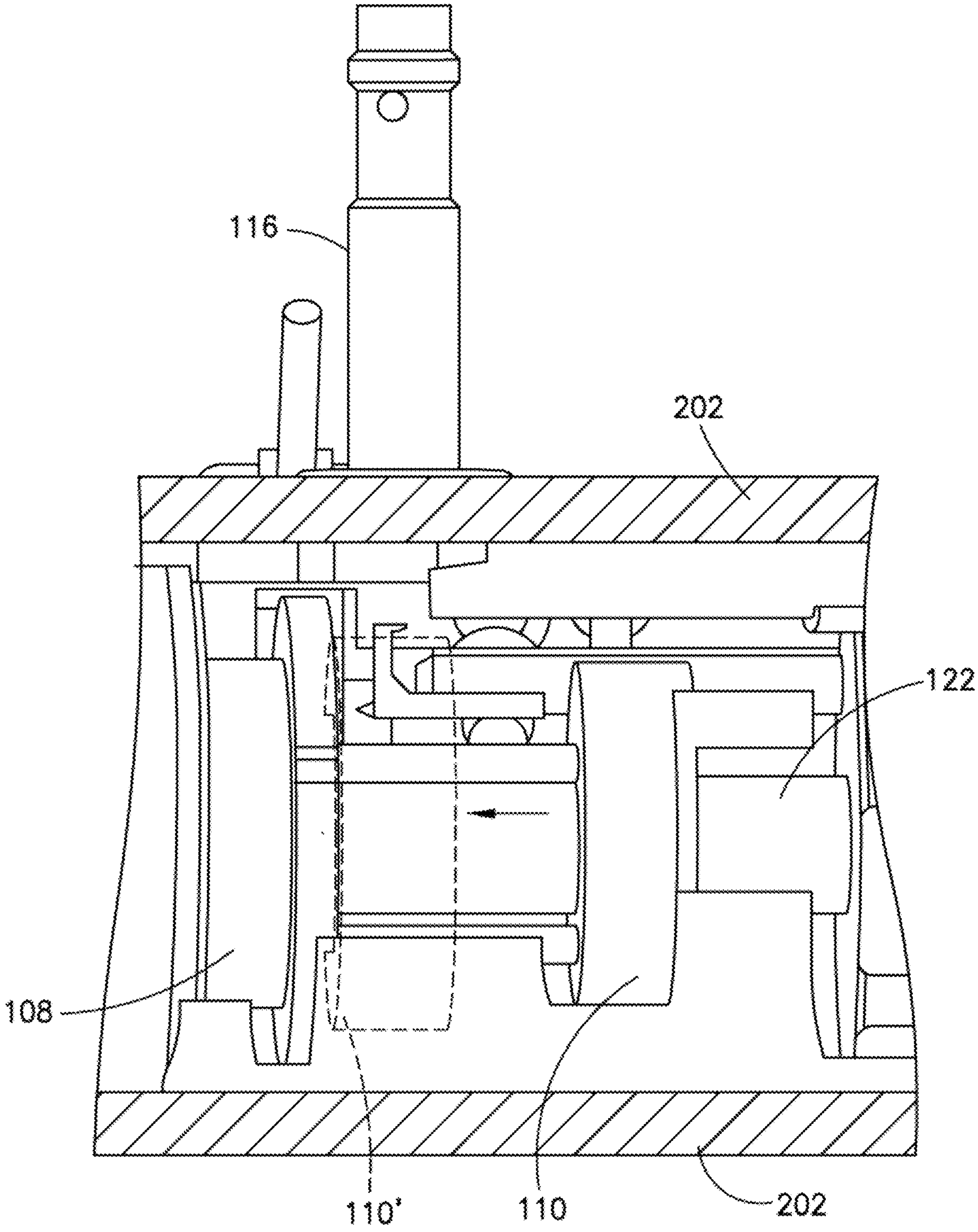
FIG. 5C is a partial cut-away perspective view showing the ejector sensor of FIG. 5A.
Figure 5D:
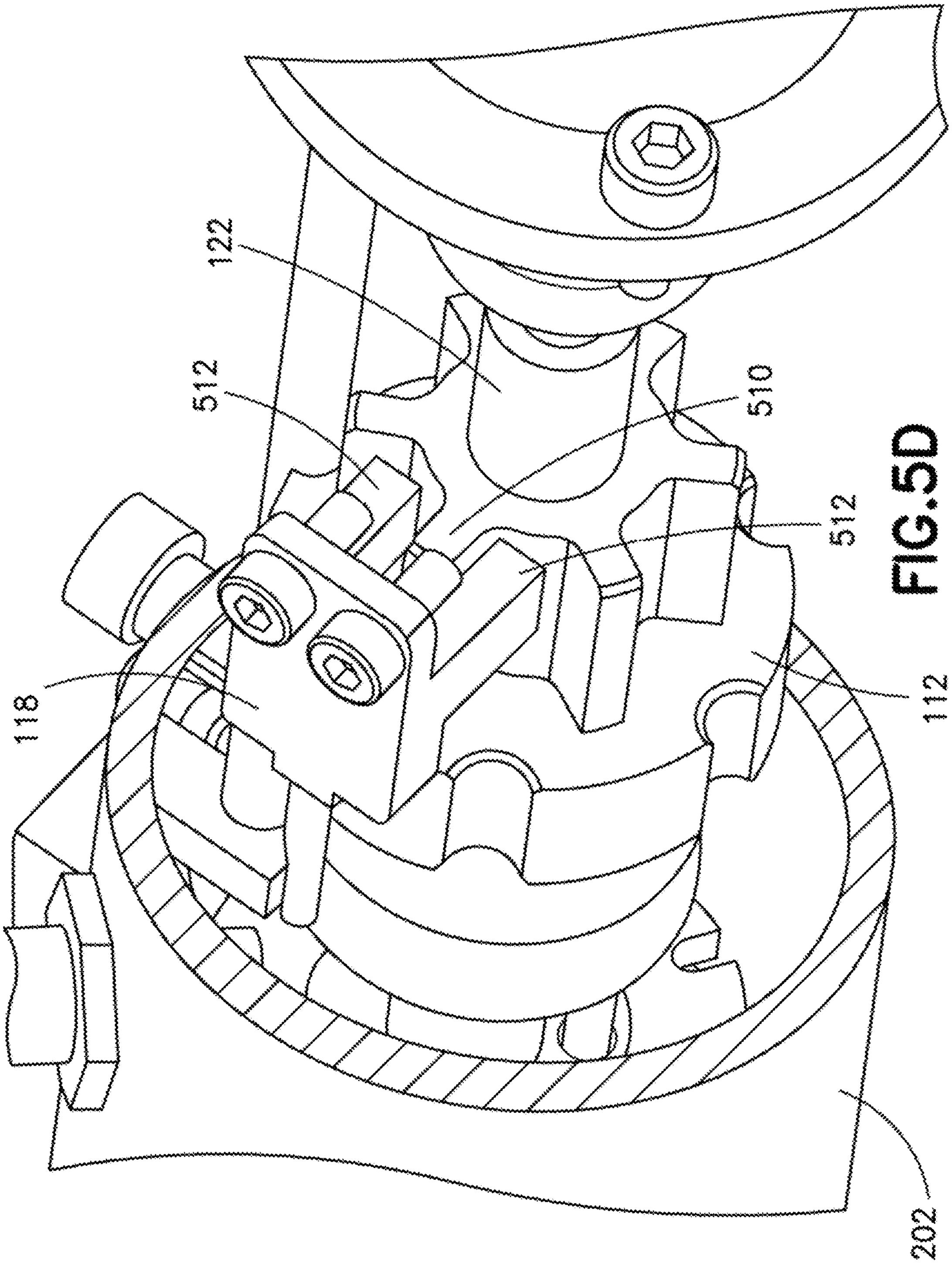
FIG. 5D is a partial cut-away perspective view showing the impeller sensor of FIG. 5A.

As shown in FIG. 5A, driver mechanism 106 includes three sensors: (i) coupler assembly sensor 114, (ii) ejector sensor 116, and (iii) impeller sensor 118. In a particular embodiment of the invention, coupler assembly sensor 114 is an optical fork sensor, mounted upon frame 202. As shown in FIG. 5A, this sensor is positioned to sense the rotation of coupler assembly 108, via milled window 502. Referring to FIG. 5B, rotation is sensed by detecting radially-equidistant voids 504 in the upper portion of coupler assembly 116 as they pass between the forks 506 of coupler assembly sensor 114. Ejector sensor 116 is an inductive proximity sensor in a particular embodiment of the invention. As illustrated in FIG. 5C, sensor 116 is mounted through frame 202, and positioned to sense when ejector 110 is translated along the longitudinal axis of threaded shaft 122 and brought into close proximity of coupler assembly 108 (position 110'). The third sensor, impeller sensor 118, is shown in FIG. 5A mounted upon frame 202 within milled window 508. In a particular embodiment of the invention, impeller sensor 118 is an optical fork sensor of the same type as was specified for coupler assembly sensor 114. As illustrated in FIG. 5D, impeller sensor 118 is positioned within the driver mechanism so that when impeller 112 is in its uppermost position along threaded shaft 122, blade 510 interrupts the optical signal between forks 512. The output of each sensor is transmitted via an interface to the capper/decapper control system (not illustrated). The information is processed and utilized by the controller system to govern the operation of the capper/decapper.

Figure 6B:
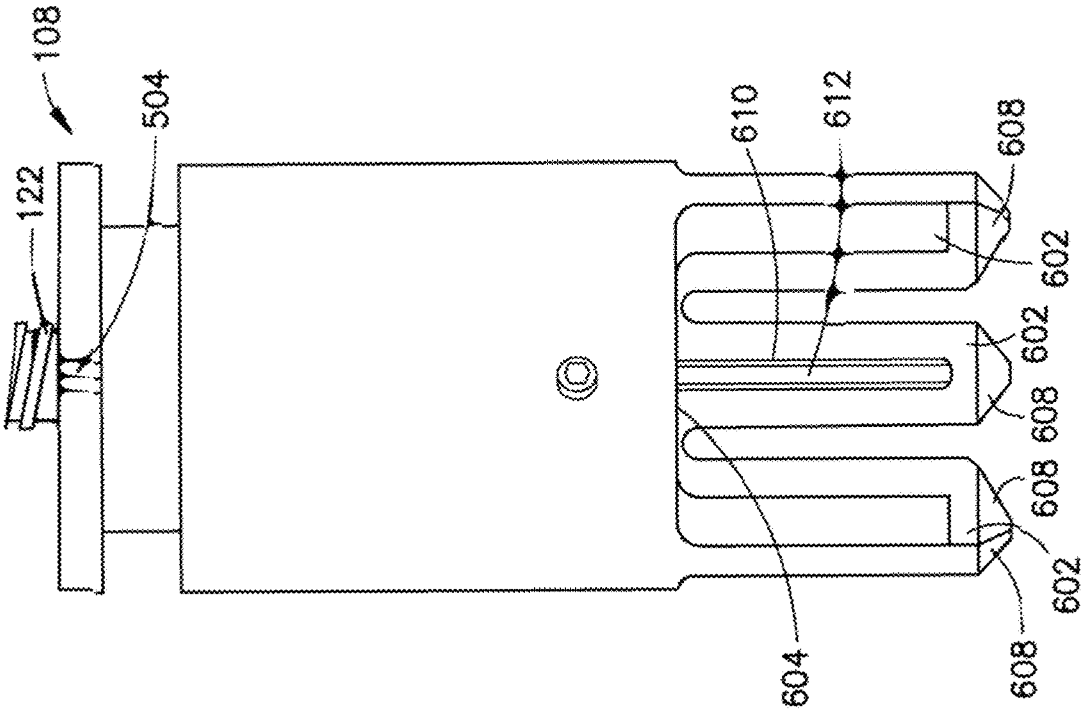
FIG. 6B is the front view of the coupler assembly of the capper/decapper system of FIG. 1B.
Figure 6A:
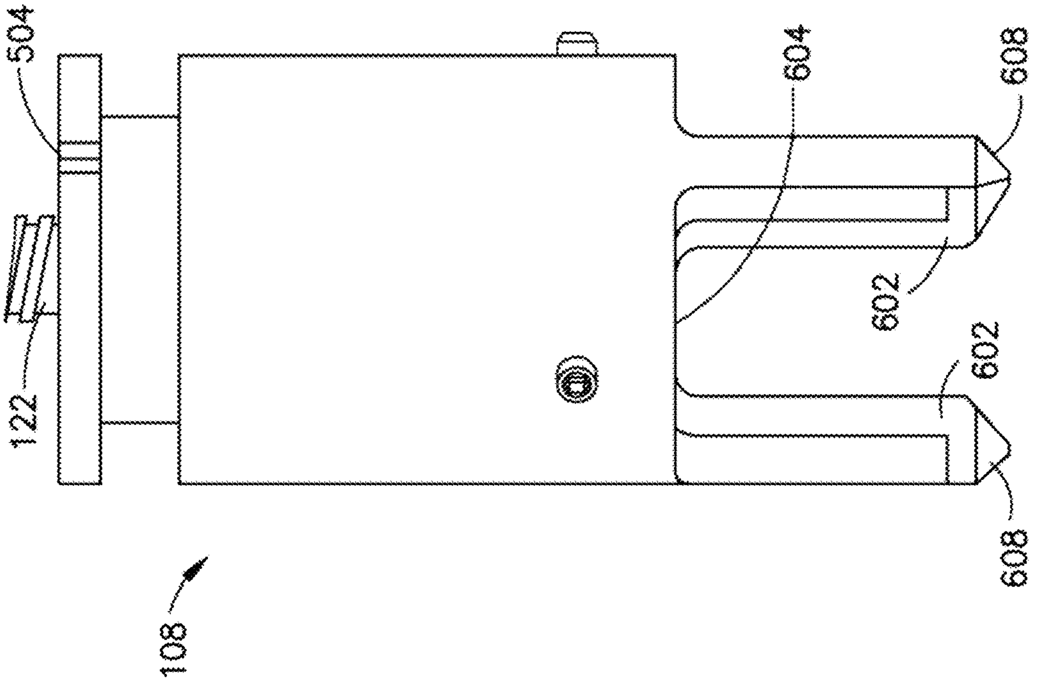
FIG. 6A is a side view of the coupler assembly of the capper/decapper system of FIG. 1B.
Figure 6D:
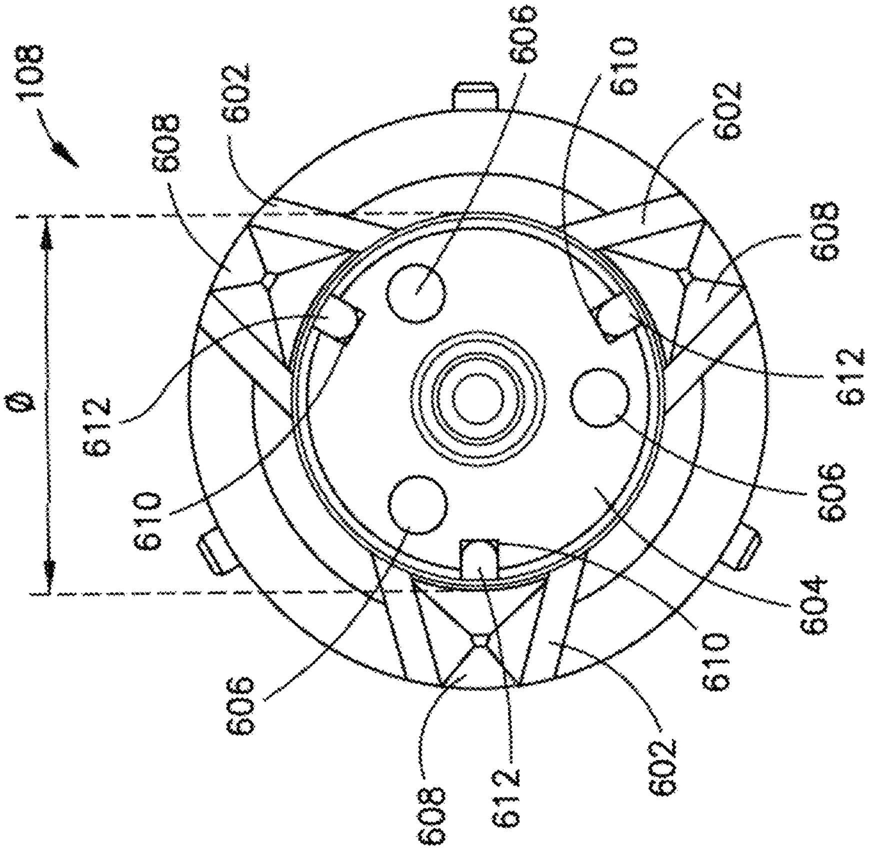
FIG. 6D is the bottom view of the coupler assembly of the capper/decapper system of FIG. 1B.
Figure 6C:
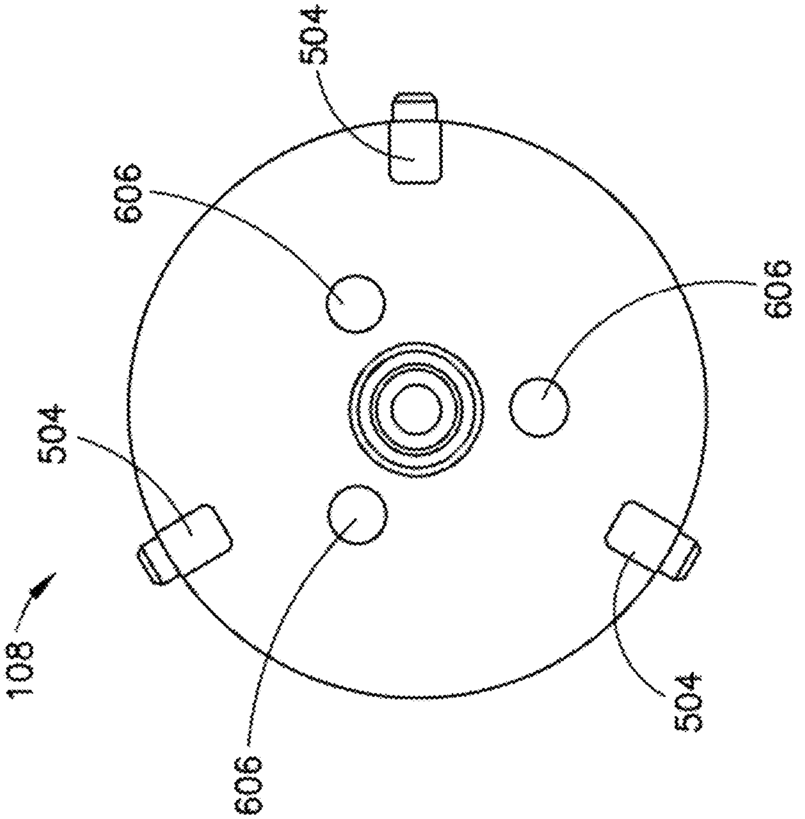
FIG. 6C is the top view of the coupler assembly of the capper/decapper system of FIG. 1B.

FIGS. 6A and 6B provide a side and front view, respectively, of coupler assembly 108, which is shown to be connected to threaded shaft 122. As shown, three fingers 602 protrude from the bottom of the coupler assembly, and are equidistantly positioned a circular interior section 604 having a diameter Ø. The coupler assembly 108 is also shown to have three circular channels 606 (see FIGS. 6C and 6D). These channels are positioned and dimensioned to permit the three ejection rods 302 of ejector 110 to freely pass through. In a preferred embodiment of the invention, each of three fingers 602 has a tapered, trapezoidal cross-section and terminates at a prismatic quadrilateral tip 608. Housed inside a chamber 610 within each finger 602 is an engagement spline 612. As illustrated in FIG. 6C, engagement splines 612 have a circular cross-section in a particular embodiment of this invention. However, this is a design choice dependent upon the particular surface features of the element with which the engagement spline is intended to mate with, and various cross-sectional shapes could be utilized.

Figure 7A:
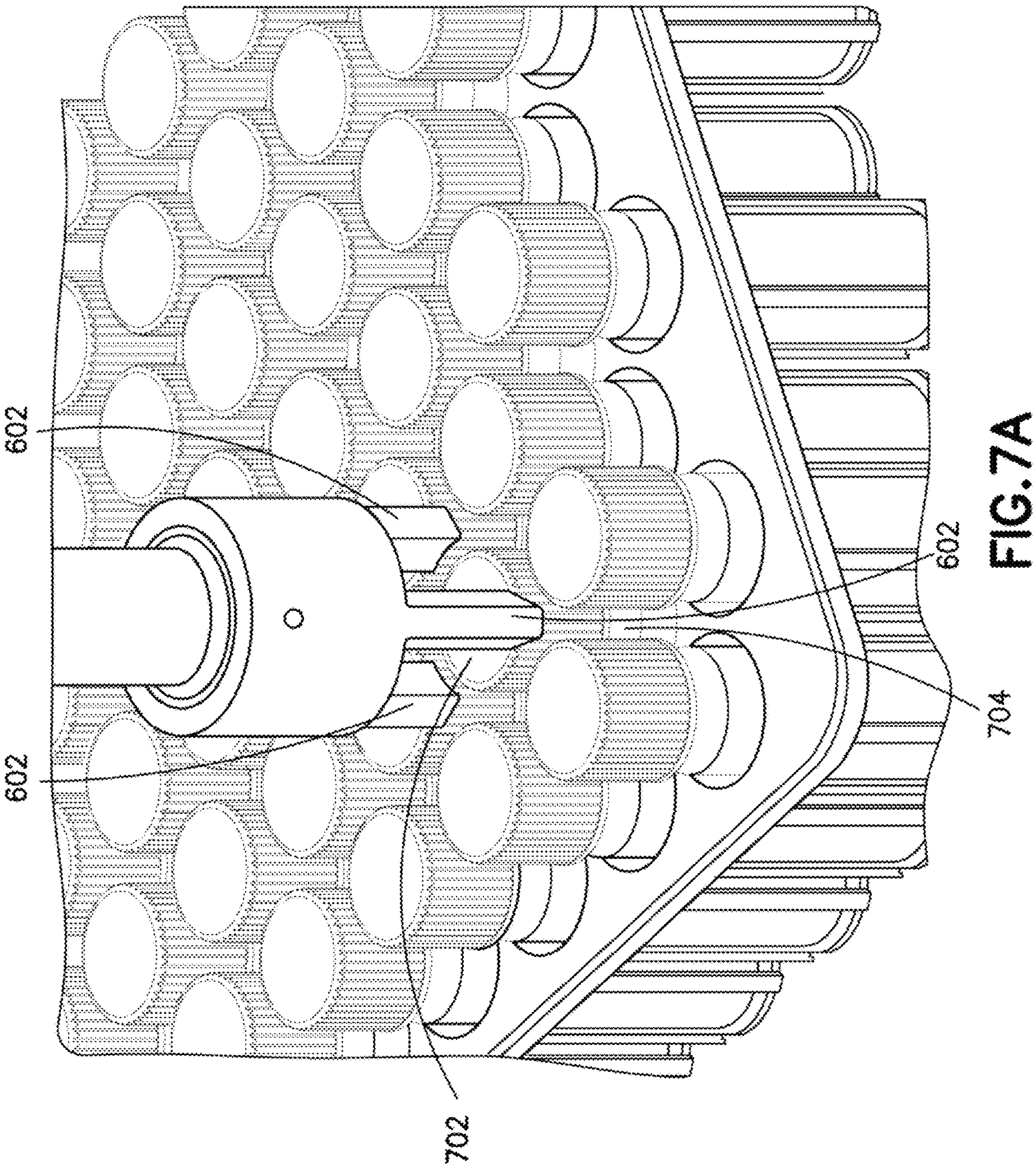
FIG. 7A is a perspective view of the coupler assembly securing to a cap.
Figure 7B:
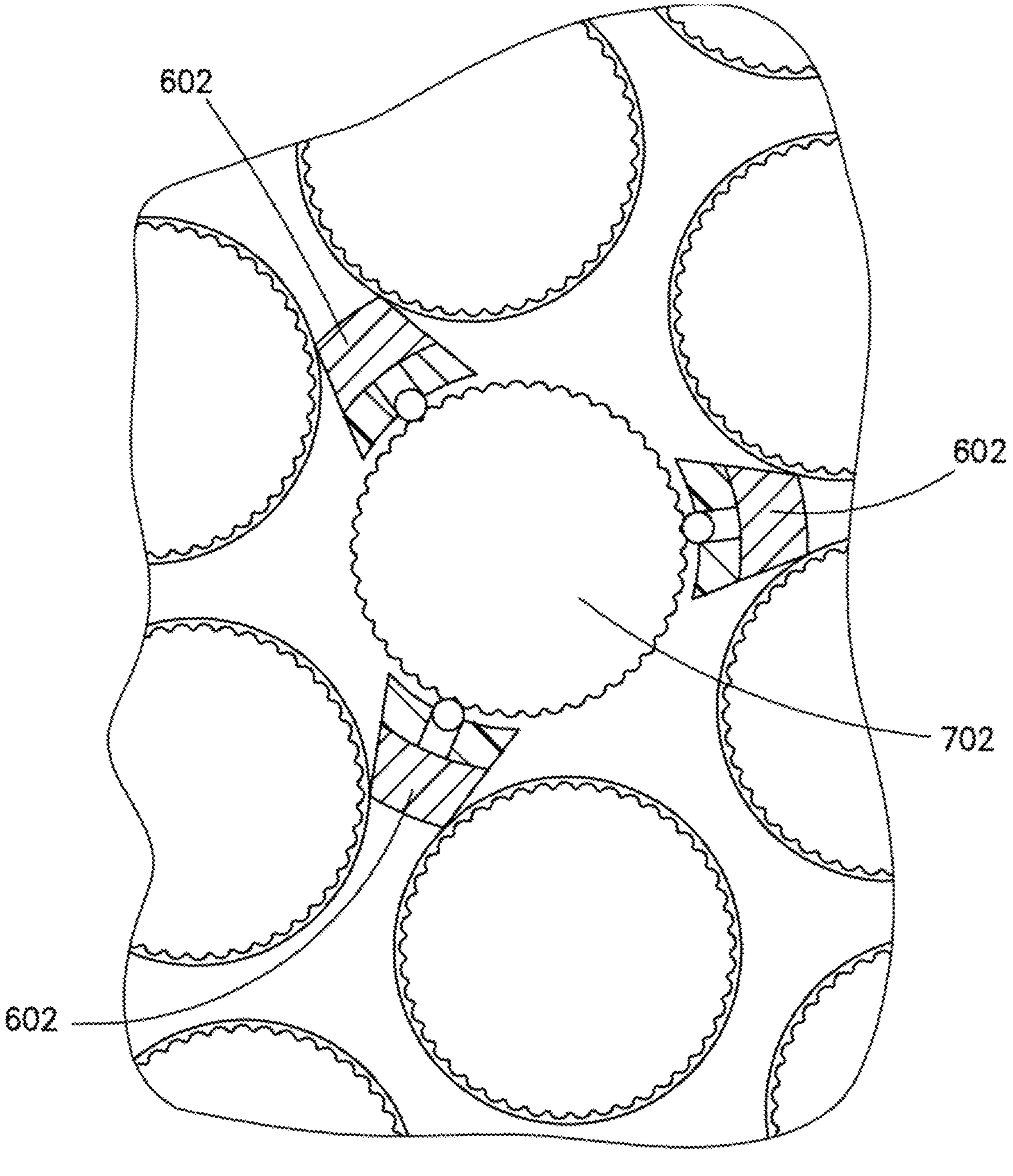
FIG. 7B is a cut away view of the coupler assembly illustrating the gripping members nested in cap ridges.
Figure 7D:
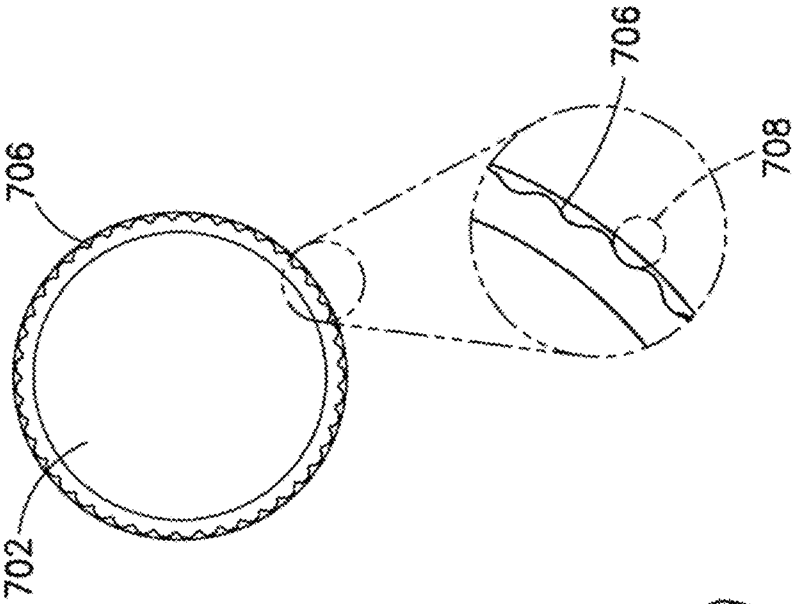
FIG. 7D is a top view of the cap of FIG. 7A.
Figure 7C:
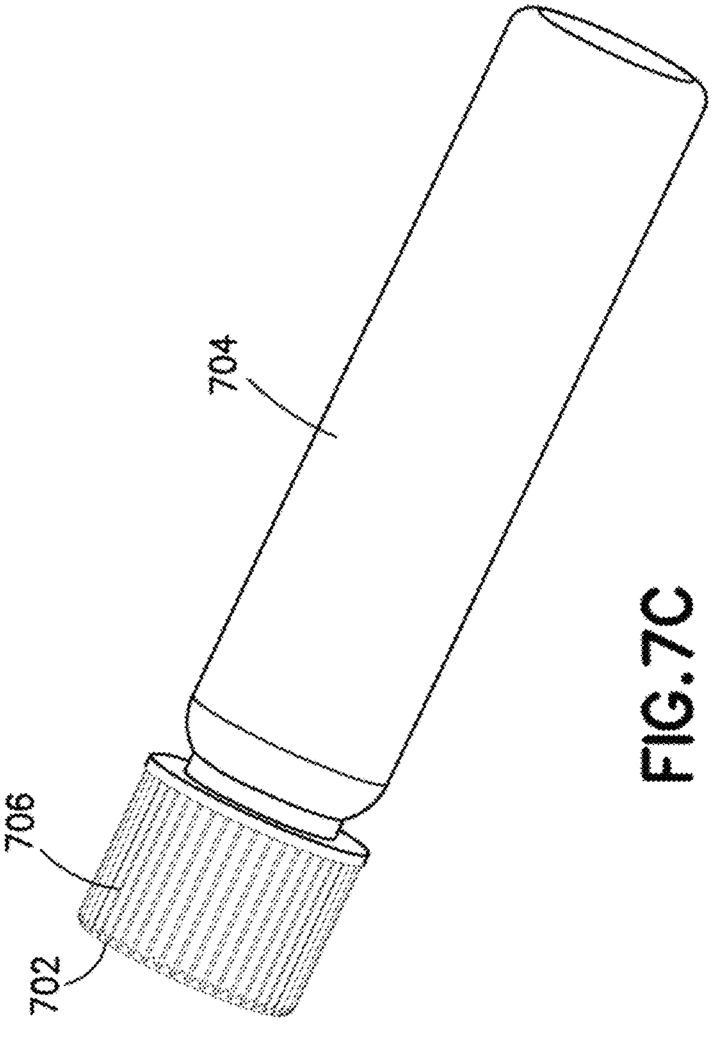
FIG. 7C is a perspective view of an exemplary cap and container.
Figure 8A:
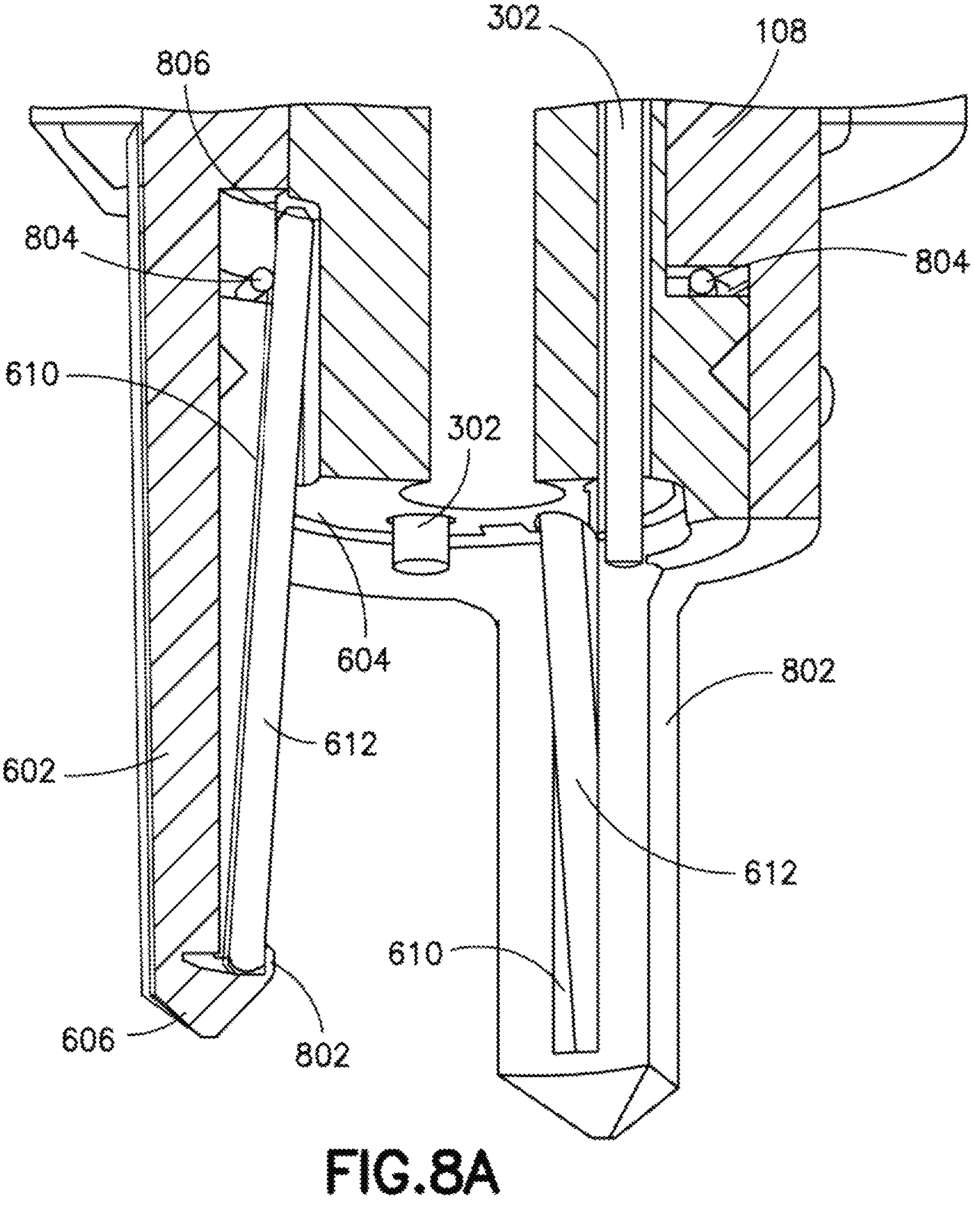
FIG. 8A is a cross-sectional view of the coupler of FIG. 5A.
Figure 8B:
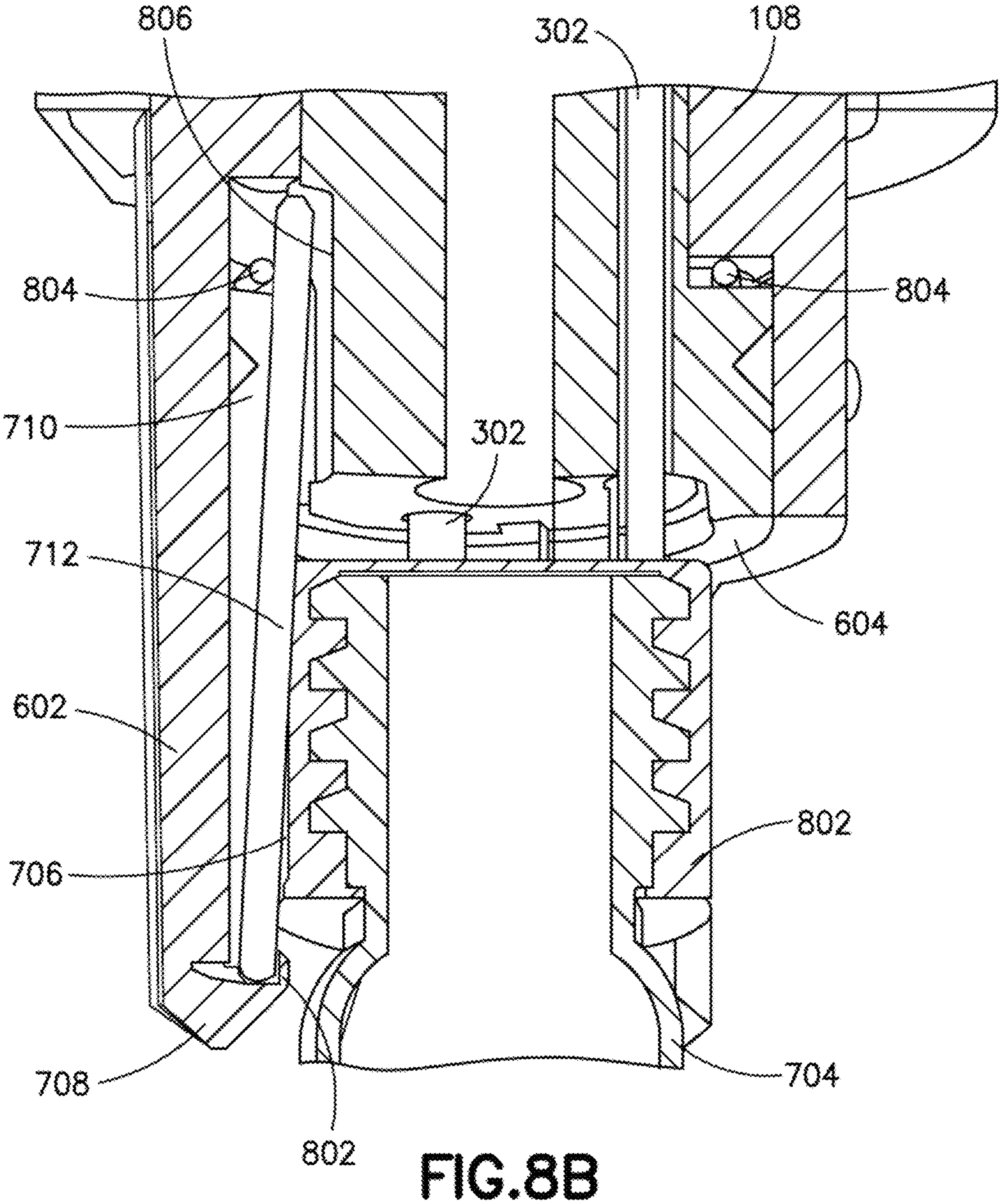
FIG. 8B is a cross-sectional view of the coupler of FIG. 5A and the cap and container of FIG. 7A.

One type of exemplary element is internally-threaded cap 702, illustrated in FIGS. 7A and 8B. This type of cap is similar to those typically employed on laboratory specimen containers such as the 8 ml Phoenix Broth products manufactured by the Becton Dickinson and Company of Franklin Lakes, NJ. Cap 702 is screwed onto threaded container 704. As shown in FIGS. 7A and 7B, the lateral surface of cap 702 is ringed by longitudinal channels 706, each of which has a substantially circular cross-section 708.

FIG. 8A provides a cross-section view of coupler assembly 108 engaging cap 704. The base of engagement spline 612 is shown to be retained by vertical lip 802 within prismatic quadrilateral tip 608 of finger 602. The top of engagement spline 612 is biased by circular spring 804, urging the upper portion of spline inward and against wall 806 of chamber 610. FIG. 8B is a cross-section view of coupler assembly 108, but with cap 702 fully inserted between fingers 602. As shown, engagement spline 612 is securely mated with longitudinal channel 706. Circular spring 804 has been deformed outward by the upper portion of spline 612, which is been pushed away from wall 806 of chamber 610 as a consequence of the insertion of cap 702. The mating between the engagement splines 612 and the longitudinal channels 706 provides a secure interface enabling a significant torque to be applied to cap 702 by coupler assembly 108 as threaded shaft 122 is rotated in either a clockwise or counter-clockwise direction.

As illustrated in FIG. 8B, cap 702 fits securely between the fingers 602 of upon insertion into coupler assembly 108. To ensure this secure fit, and the resultant mating of the engagement splines, coupler assembly 108 must be designed with a cap-specific diameter, Ø (see FIG. 6D).

Self-Actuating Mechanically-Biased Container Restraint

Figure 9:
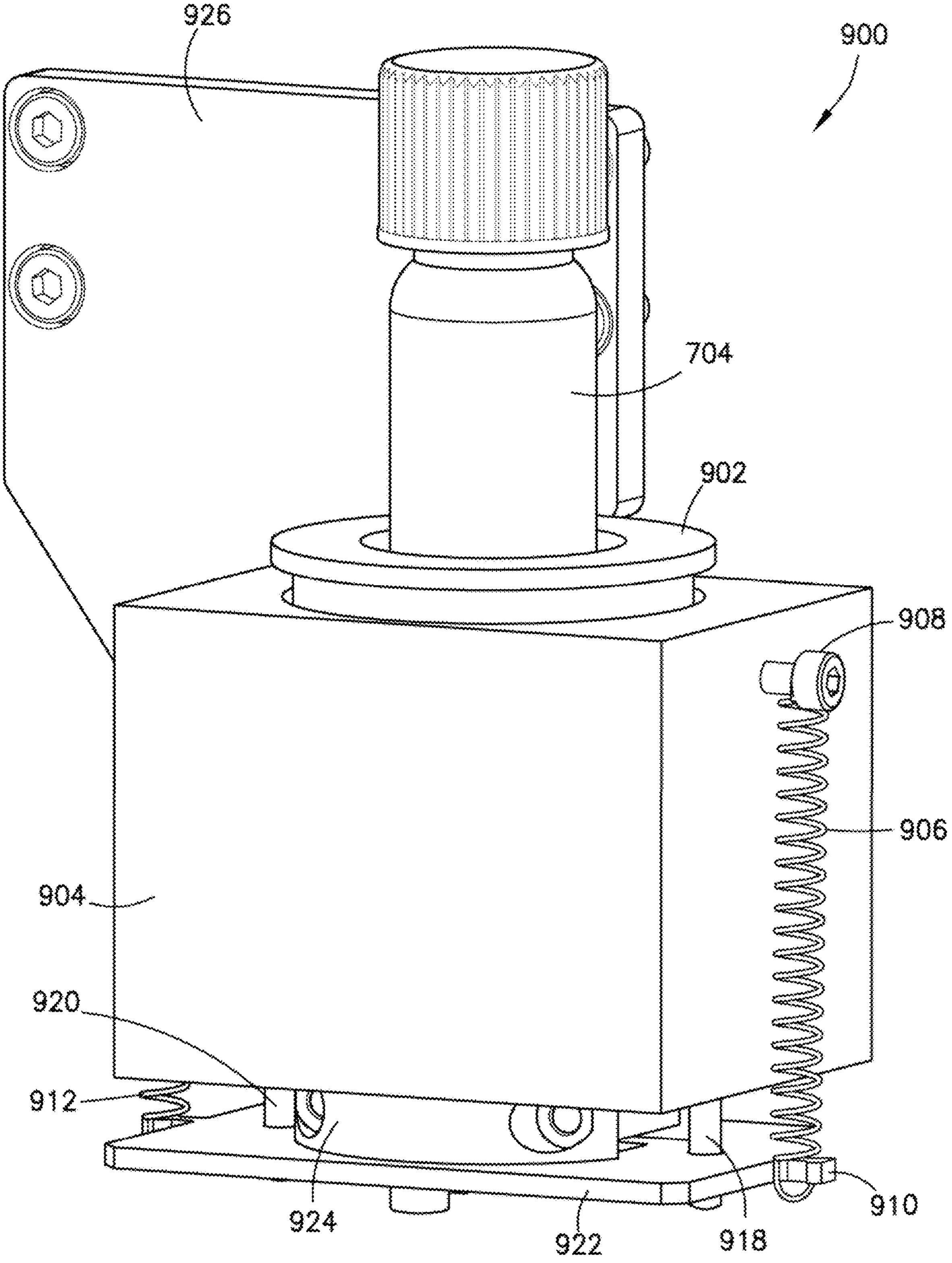
FIG. 9 is a perspective view of the self-actuating mechanically-bias container restraint.
Figure 10:
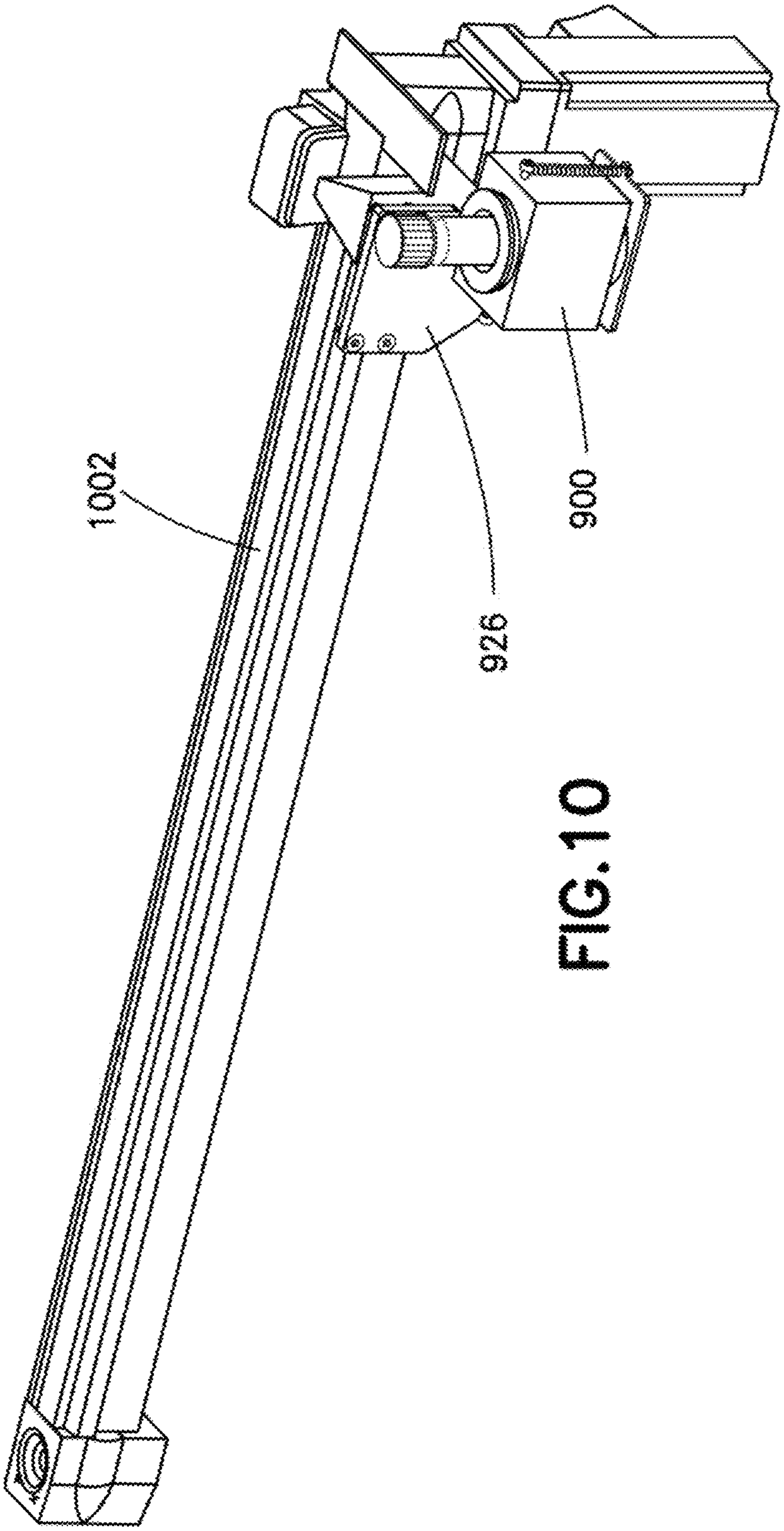
FIG. 10 is a perspective view of container restraint of FIG. 9 upon single-axis robotic arm.
Figure 11A:
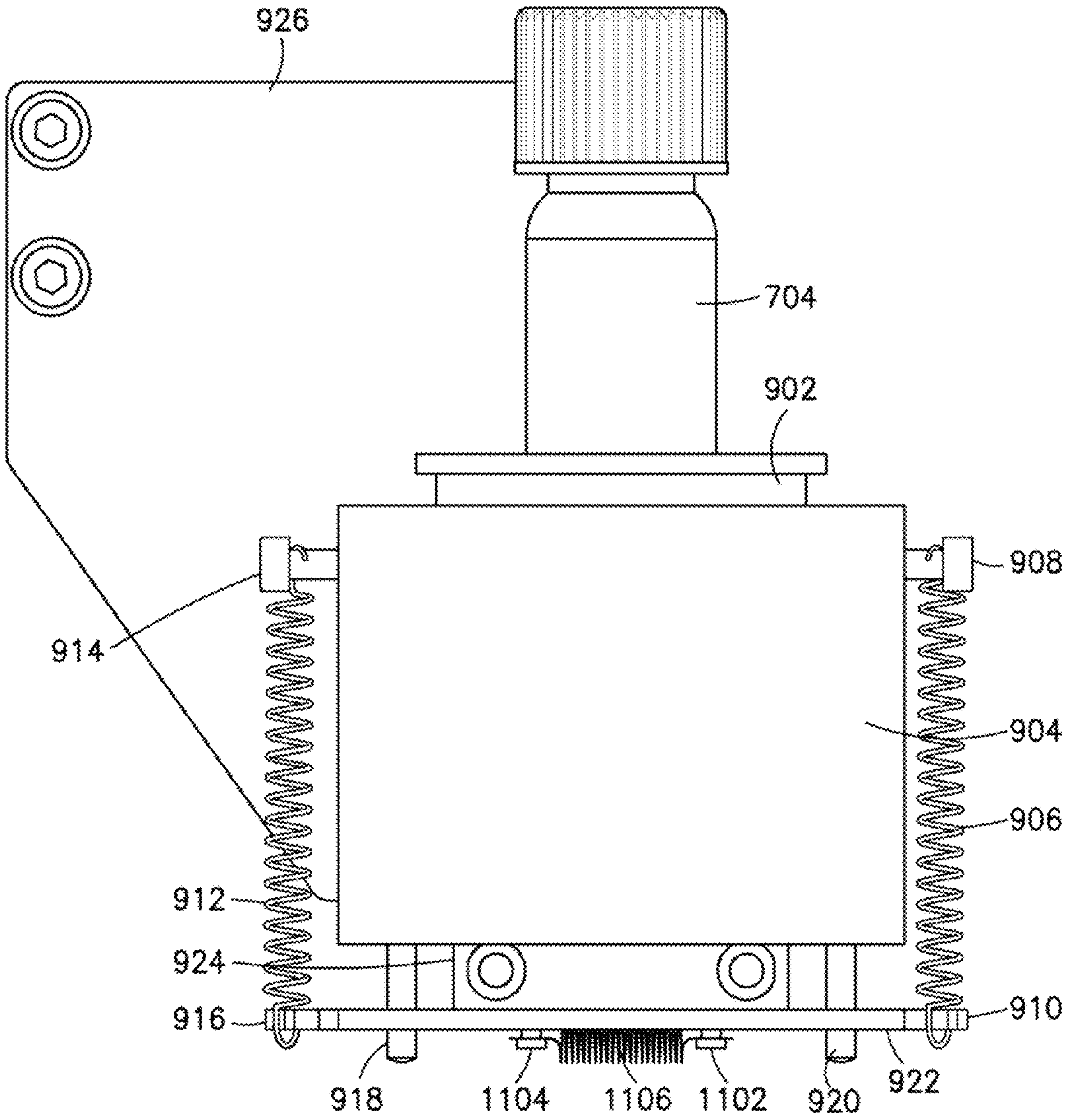
FIG. 11A is a front view of the container restraint of FIG. 9.
Figure 11B:
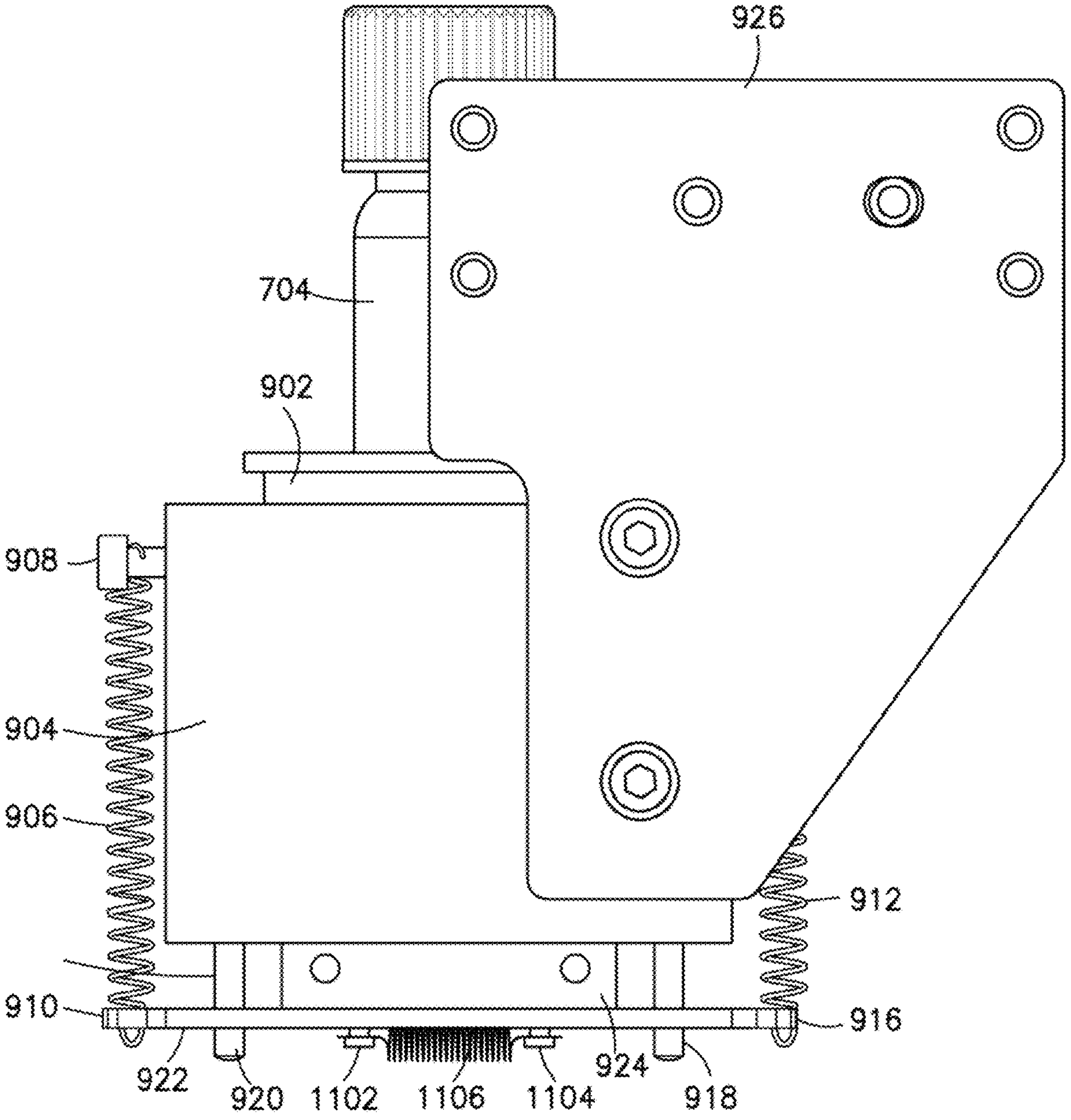
FIG. 11B is a rear view of the container restraint of FIG. 9.
Figure 11C:
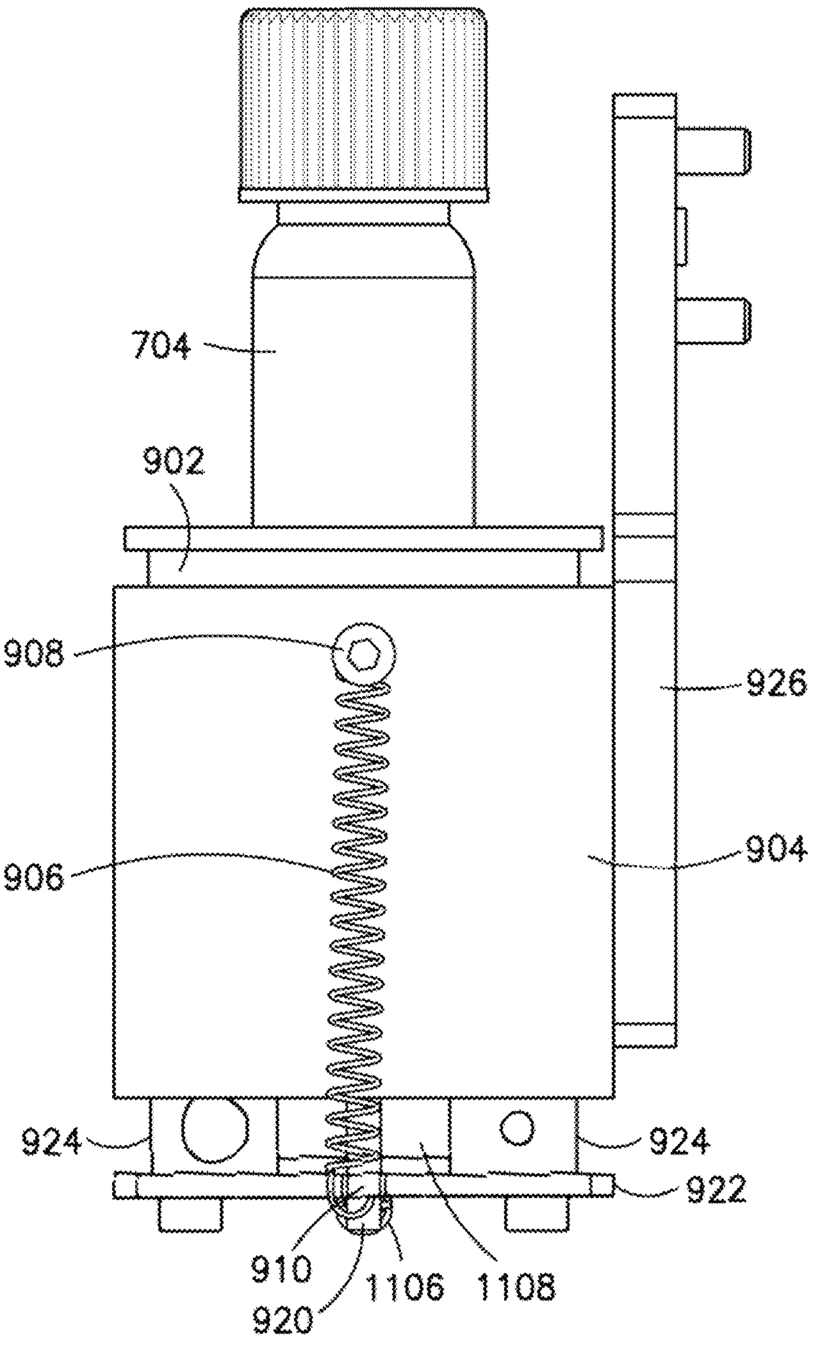
FIG. 11C is a right view of the container restraint of FIG. 9.
Figure 11D:
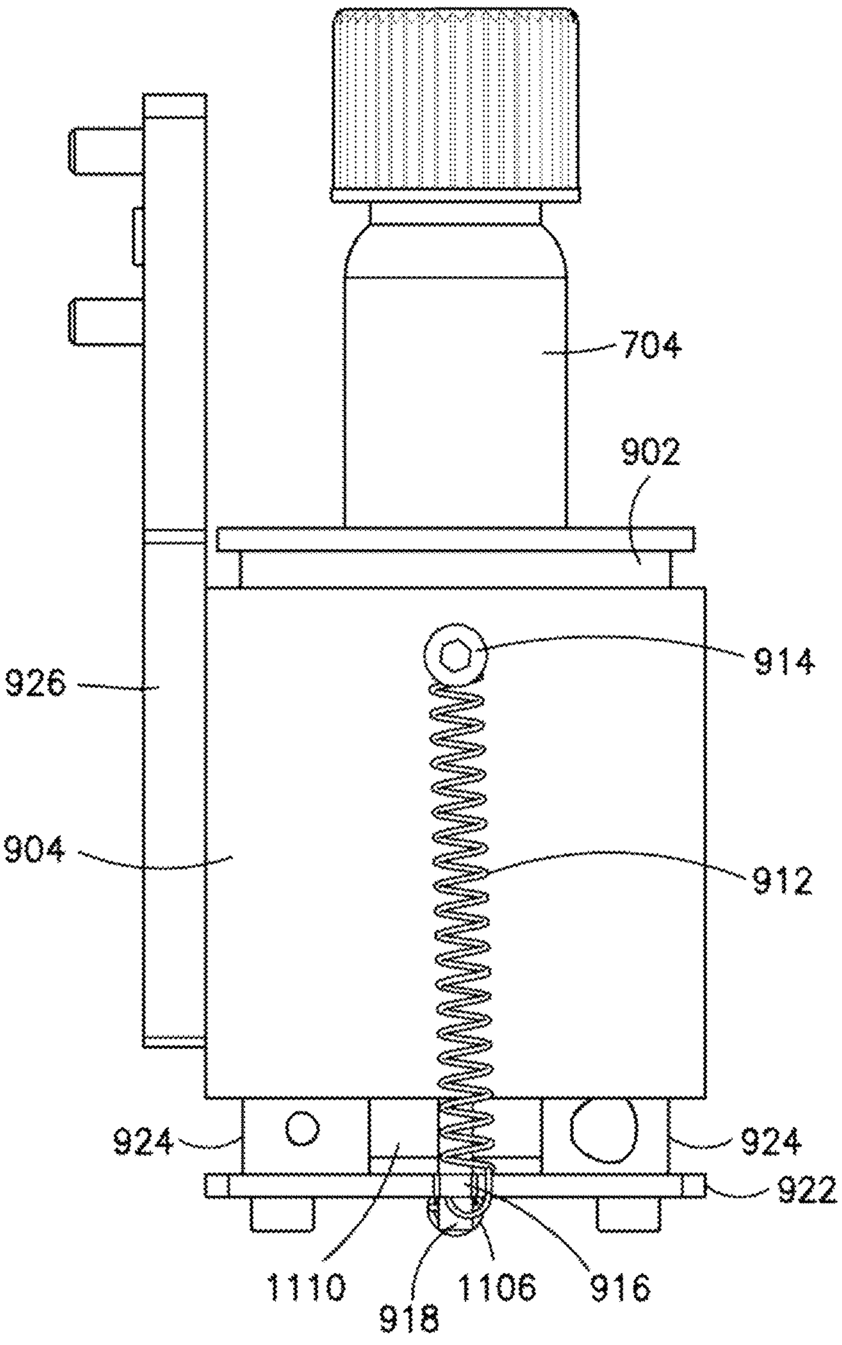
FIG. 11D is a left view of the container restraint of FIG. 9.
Figure 11E:
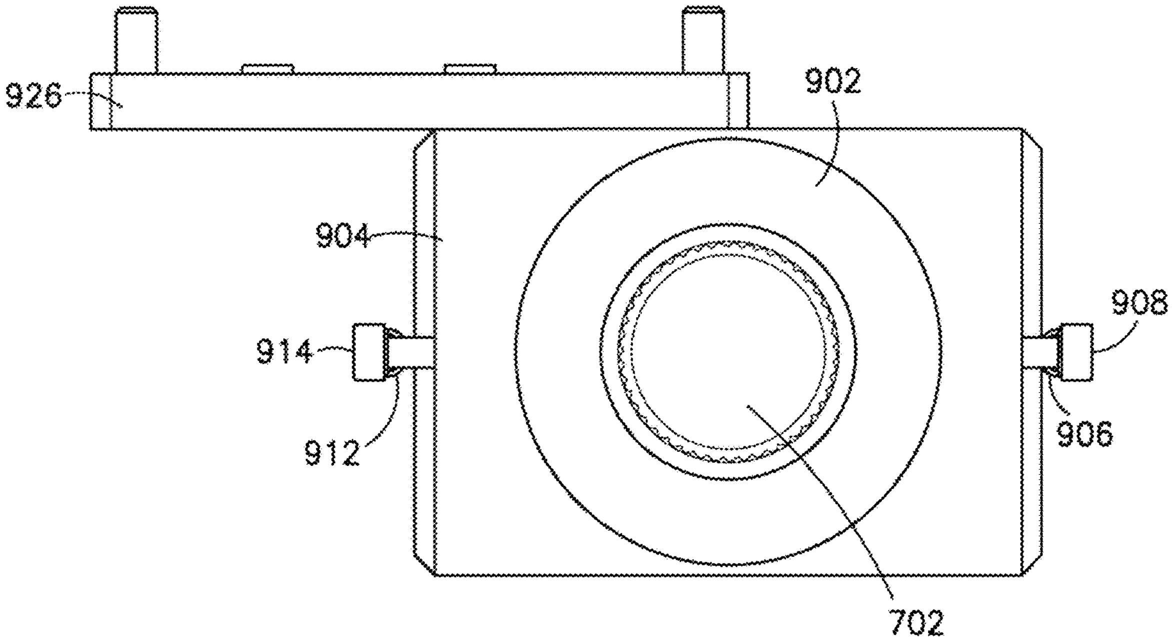
FIG. 11E is a top view of the container restraint of FIG. 9.
Figure 11F:
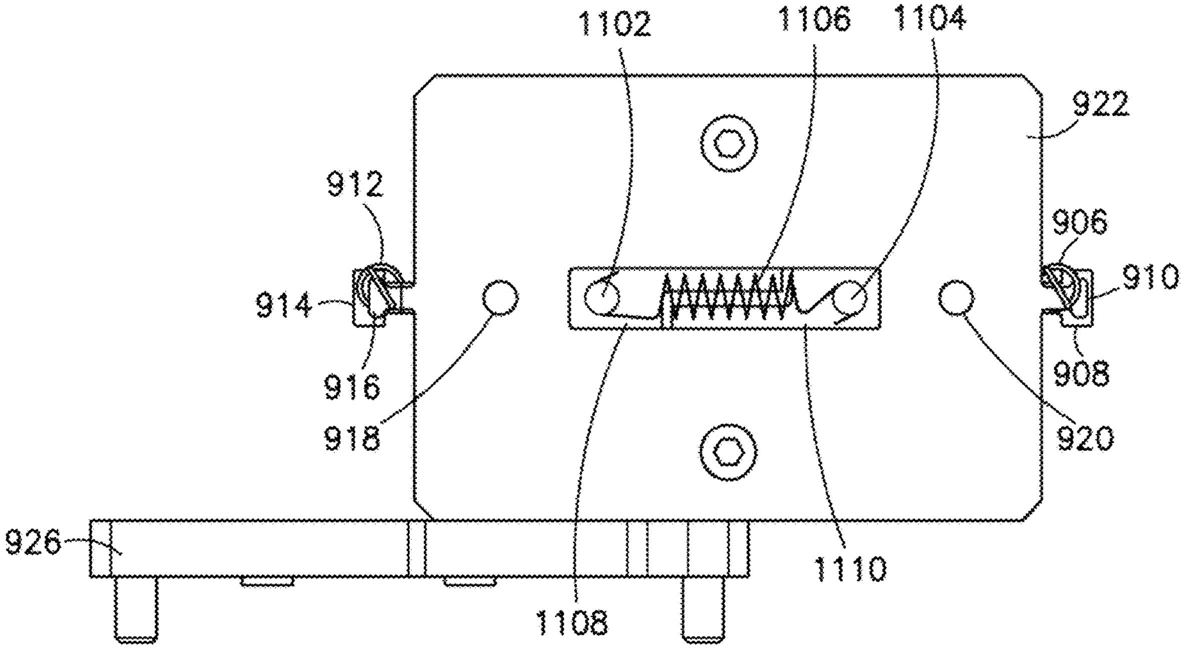
FIG. 11F is a bottom view of the container restraint of FIG. 9.

FIG. 9 provides a perspective view of an exemplary embodiment of the container restraint invention 900. Container sleeve 902, including a central container accepting cavity, is shown positioned within exterior frame or block 904. Vertical spring 906 is shown extended between upper spring anchor 908 and lower spring anchor 910. A portion of vertical spring 912, situated along the opposite side of exterior frame 904 from vertical spring 906, is also depicted. Vertical spring 912 is extended between upper spring anchor 914 and lower spring anchor 916 (not depicted in this view). Guide pins 918 and 920 are shown fastened to platform 922 and extending up into the exterior frame of container restraint 900. The base of gripping assembly 924 is shown fastened to platform 922 and situated between guide pins 918 and 920. In addition, capped laboratory specimen container 704 is illustrated fully inserted and depressed into container restraint 900. A mounting flange 926 is shown affixed to the rear back wall of the exterior frame 904. This mounting flange is not essential to the invention, but rather provided as an example of a means by which the container restraint can be mounted in a manner that permits container sleeve 902 and platform 922 to be translated vertically with respect to exterior frame 904 during operation of the container restraint. FIG. 10 provides a perspective view of container restraint 900 mounted, via flange 926, upon single-axis robotic arm 1002.

FIGS. 11A, 11B, 11C, 11D, 11E and 11F provide, respectively, front, rear, right, left, top and bottom views of container restraint 900. Horizontal spring anchors 1102 and 1104 are shown to be affixed, respectively to the bottom of pivotally-mounted levers 1108 and 1110 (FIG. 12A), both of which are situated within gripping assembly 924. Horizontal spring 1106 is shown to be extended between the horizontal spring anchors.

Figure 12A:
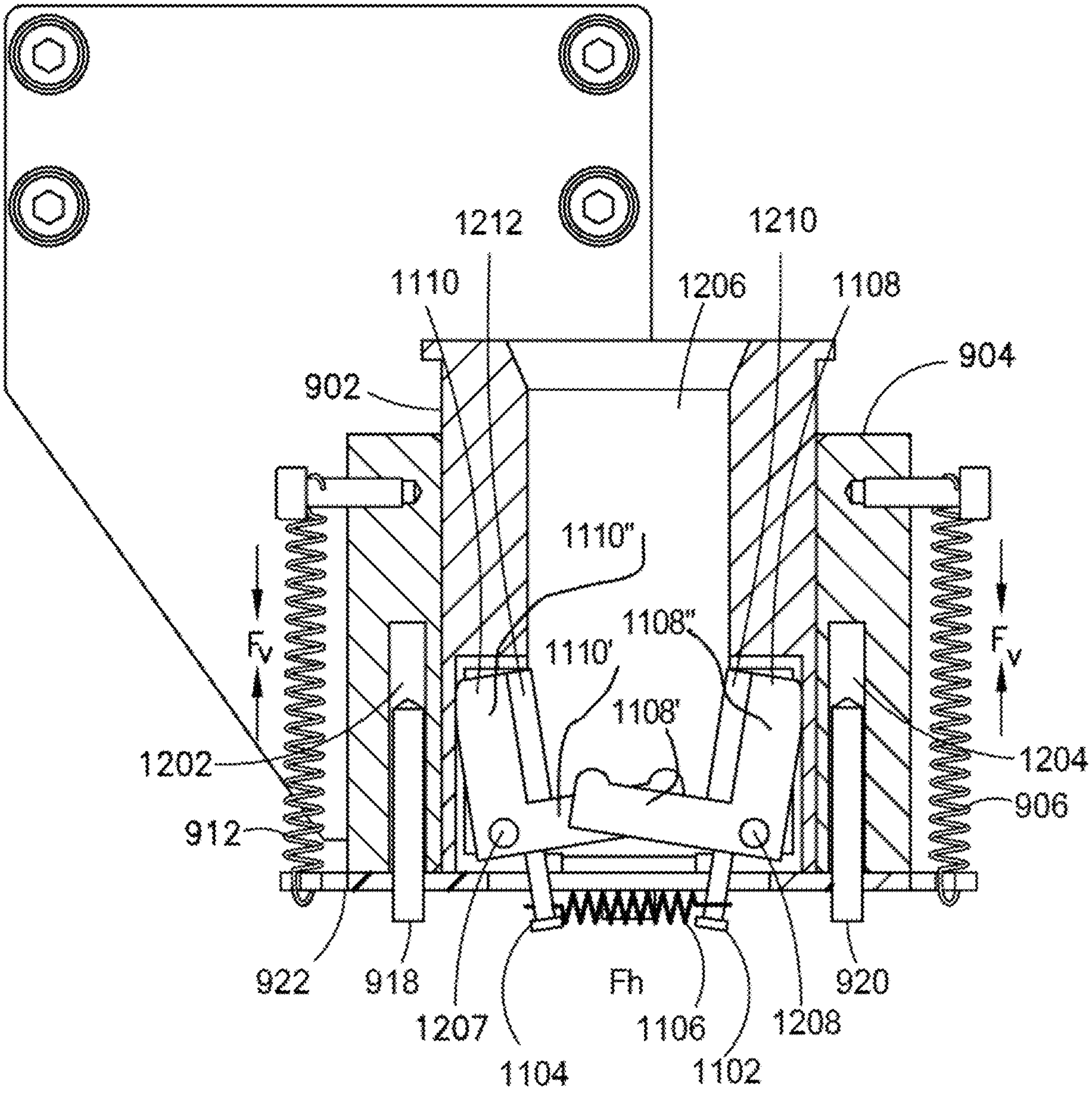
FIG. 12A is a front, cross-sectional view of the container restraint of FIG. 9 depicting an unloaded/unactuated state.

FIGS. 12A-E provide cross-sectional views of container restraint 900. In particular, FIG. 12A depicts the container restraint prior to the insertion or loading of any container. Vertical springs 906 and 912 serve to bias platform 922 against the lower surface of exterior frame 904 with a pull-up force of $2F_v$. Guide pins 918 and 920 are shown to be fully inserted within guide channels 1202 and 1204, respectively. Horizontal spring 1106 is shown to bias horizontal spring anchors 1102 and 1104 inward with a force of $F_h$. This inward biasing force must be great enough to cause pivotally-mounted levers 1108 and 1110 to pivot about pins 1207 and 1208, respectively, and less than the nominal downward force, $F_{Inom}$, that will be exerted upon a container by an automated system during insertion into the container restraint, and the subsequent capping or decapping. The biased pivoting places the levers in a position suitable for accepting the loading of a container. Each lever has a lower horizontal element (1108', 1110') and an upper vertical element (1108", 1110"). In the loading position, the lower horizontal element of each lever is rotated so that the tip of each is placed in an elevated posture within the central cavity 1206 of container sleeve 902. Consequently, this rotation places the upper vertical elements in a position where the top of each is moved outward, away from the center of cavity 1206. The interior surface of each upper vertical element is contoured to conform to the radial cross-sectional shape of the body of the type of container that is to be constrained (a circular cross-section in this embodiment), and a flexible friction pad (1210, 1212) is affixed to conform to the face of each interior surface. These pads may be comprised of rubber, a synthetic polymer material, or other suitable material that will serve to provide a cumulative static friction force of $F_s$ when engaged against the exterior of the container. These pads have a suitable size to provide the target cumulative static friction force.

Figure 12B:
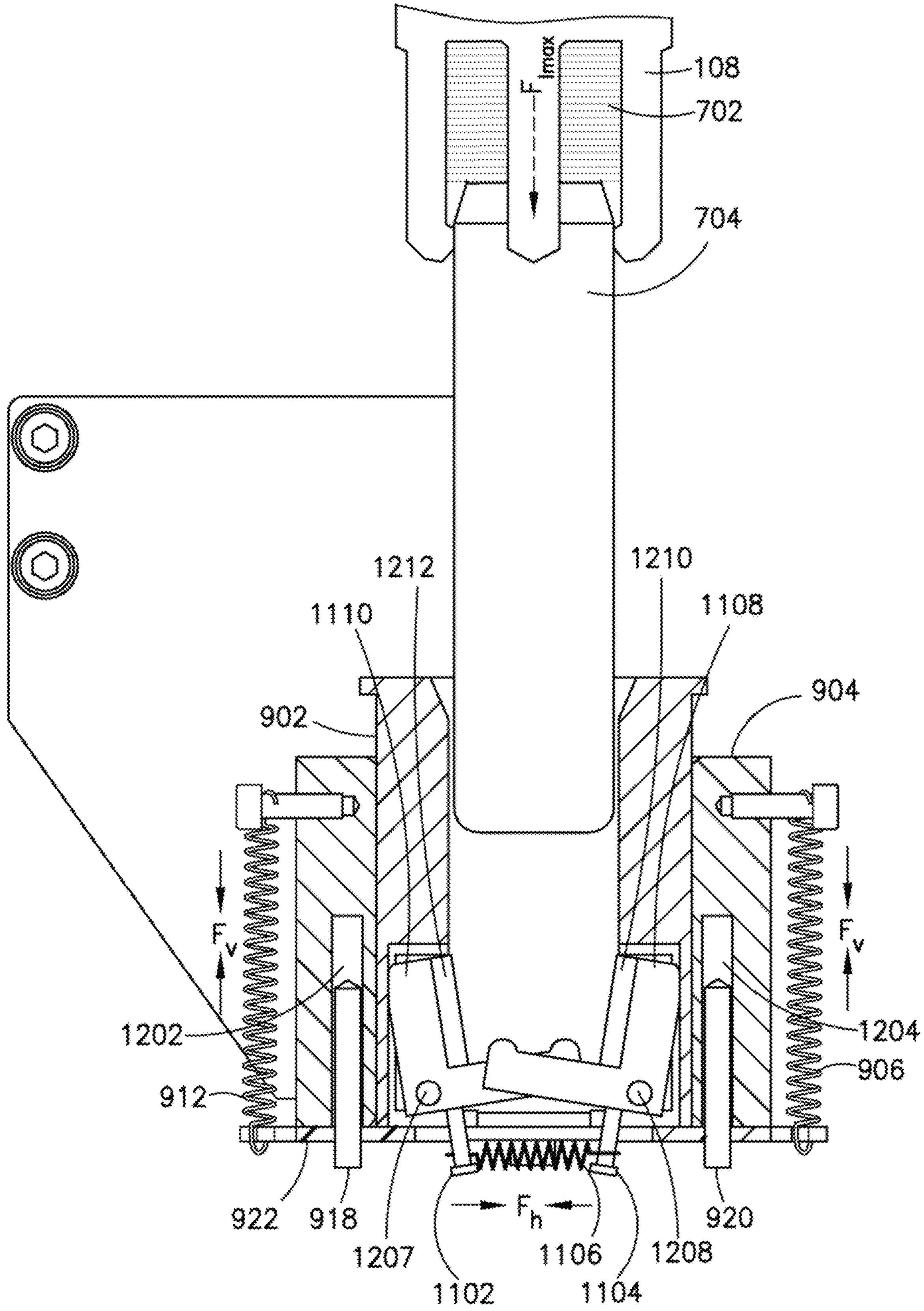
FIG. 12B is a front, cross-sectional view of the container restraint of FIG. 9 depicting a partially-loaded/unactuated/undepressed state.
Figure 12C:
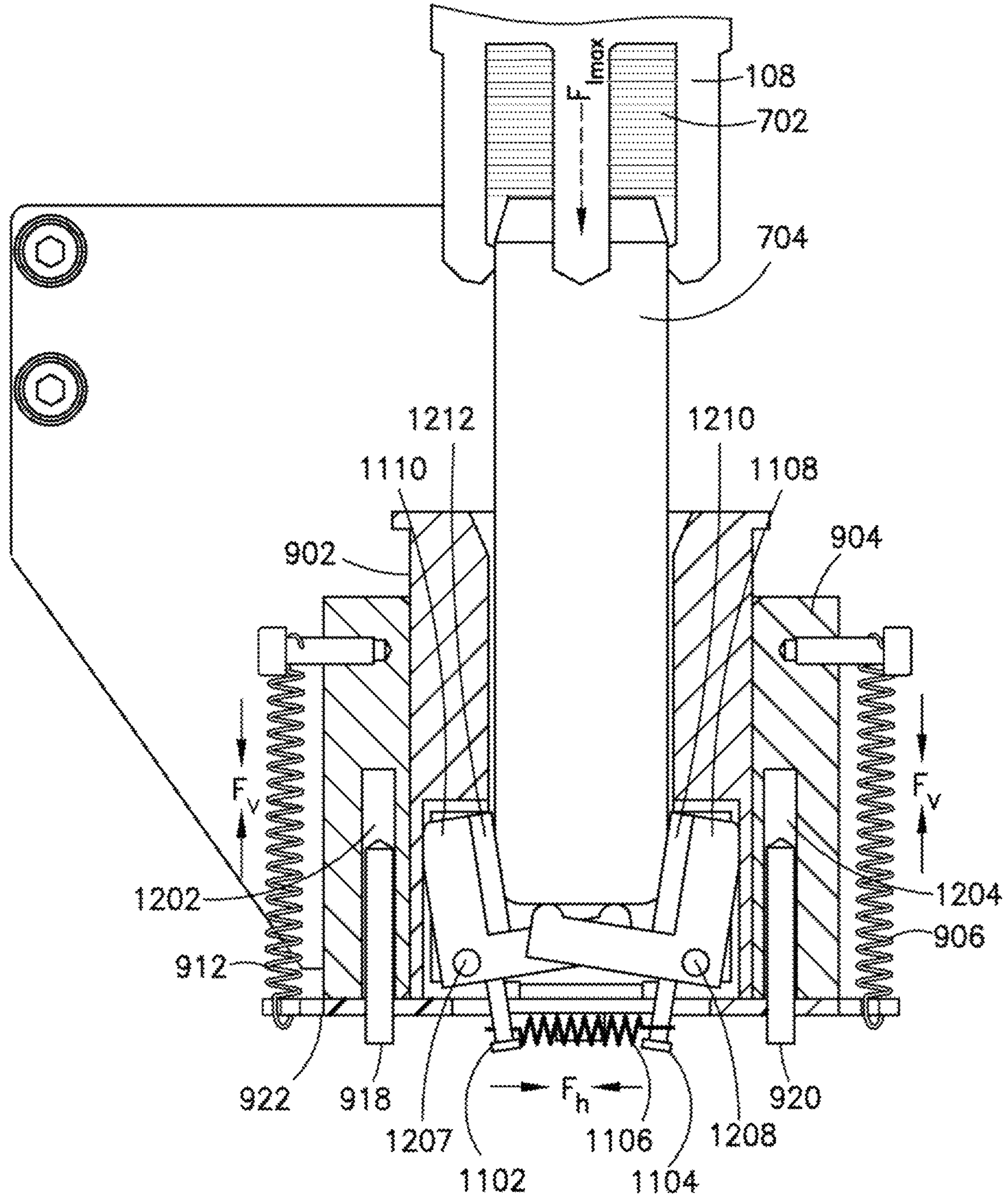
FIG. 12C is a front, cross-sectional view of the container restraint of FIG. 9 depicting a loaded/unactuated/undepressed state.

FIG. 12B shows coupler assembly 108 gripping container 704 as it inserts the container into central cavity 1206 of container sleeve 902. A nominal insertion force, $F_{Inom}$, is exerted by coupler assembly 108 as the container is moved downward into central cavity 1206. At this point of the insertion process, the container has not engaged pivotally-mounted levers 1108 and 1110. Vertical springs 906 and 912 remain in their initial, resting positions. Horizontal spring 1106 maintains inward force $F_h$ upon horizontal spring anchors 1102 and 1104 and the associated pivotally-mounted levers (1108, 1110) remain in a position suitable for accepting the loading of a container. In FIG. 12C the container has been brought into contact with the elevated tip of the lower horizontal element of each of the pivotally-mounted levers (1108, 1110). The container has yet to be advanced into the central cavity to a point where it begins to depress the elevated tips of the levers' horizontal elements (1108', 1110'). As in FIG. 12A, vertical springs 906 and 912 remain in their initial, resting positions. Horizontal spring 1106 maintains inward force $F_h$ upon horizontal spring anchors 1102 and 1104 and the associated pivotally-mounted levers (1108, 1110) remain in a position suitable for accepting the loading of a container.

Figure 12D:
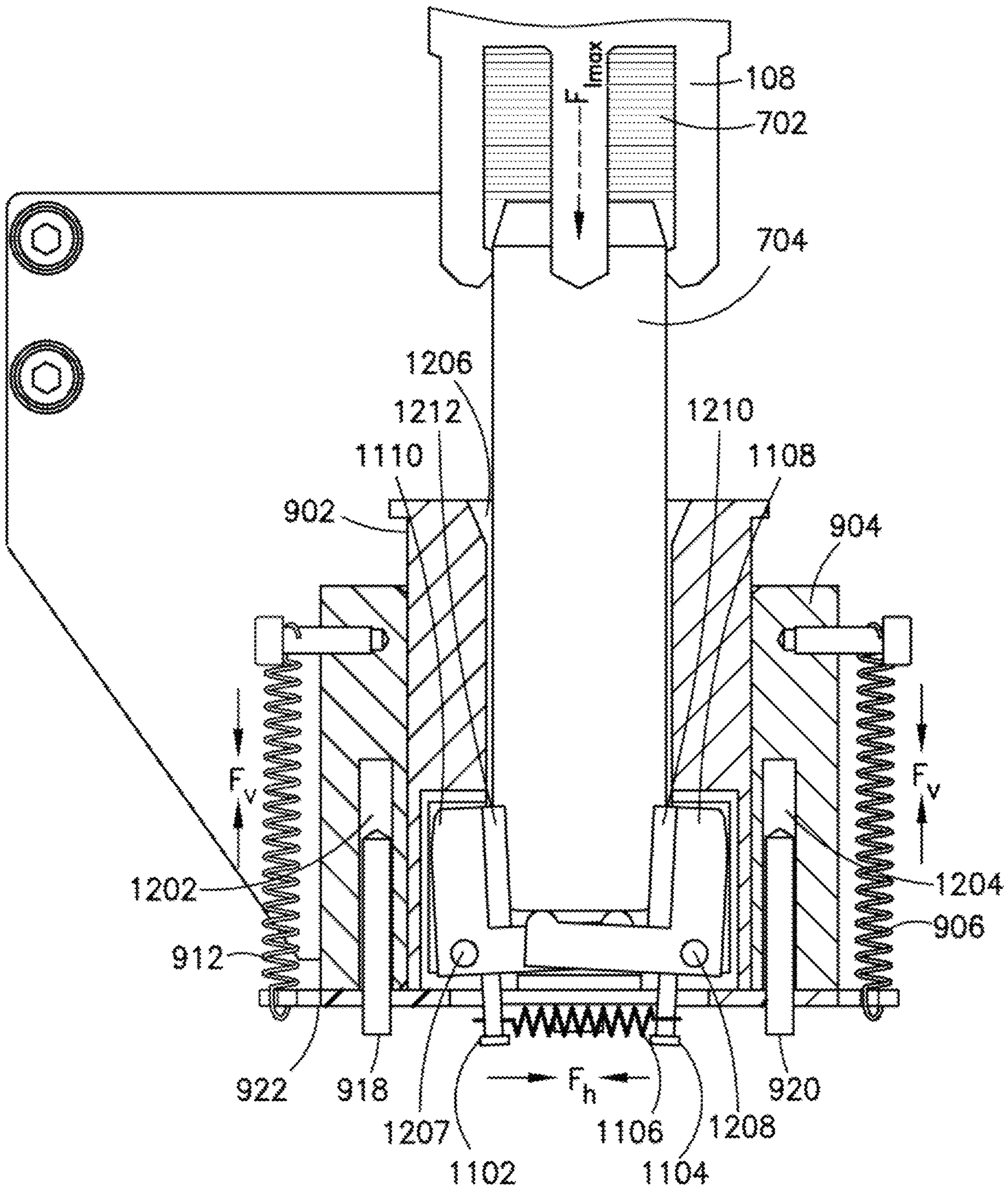
FIG. 12D is a front, cross-sectional view of the container restraint of FIG. 9 depicting a loaded/actuated/undepressed state.

FIG. 12D provides an illustration of the further advancement of container 704 into container 902 by coupler assembly 108. At this juncture, force $F_{Inom}$ is fully exerted upon the elevated tips of the levers' horizontal elements. This force ($F_{Inom}$), being greater than force $F_h$ exerted upon horizontal spring anchors 1102 and 1104 and the associated pivotally-mounted levers (1108, 1110), causes horizontal spring 1106 to extend or stretch as the elevated tips of the levers' horizontal elements are forced downward, and the top portion of each of the upper vertical elements of the levers are brought inward toward the center of cavity 1206. This inward motion causes flexible friction pads (1210, 1212) to engage and grip the exterior of container 704.

Figure 12E:
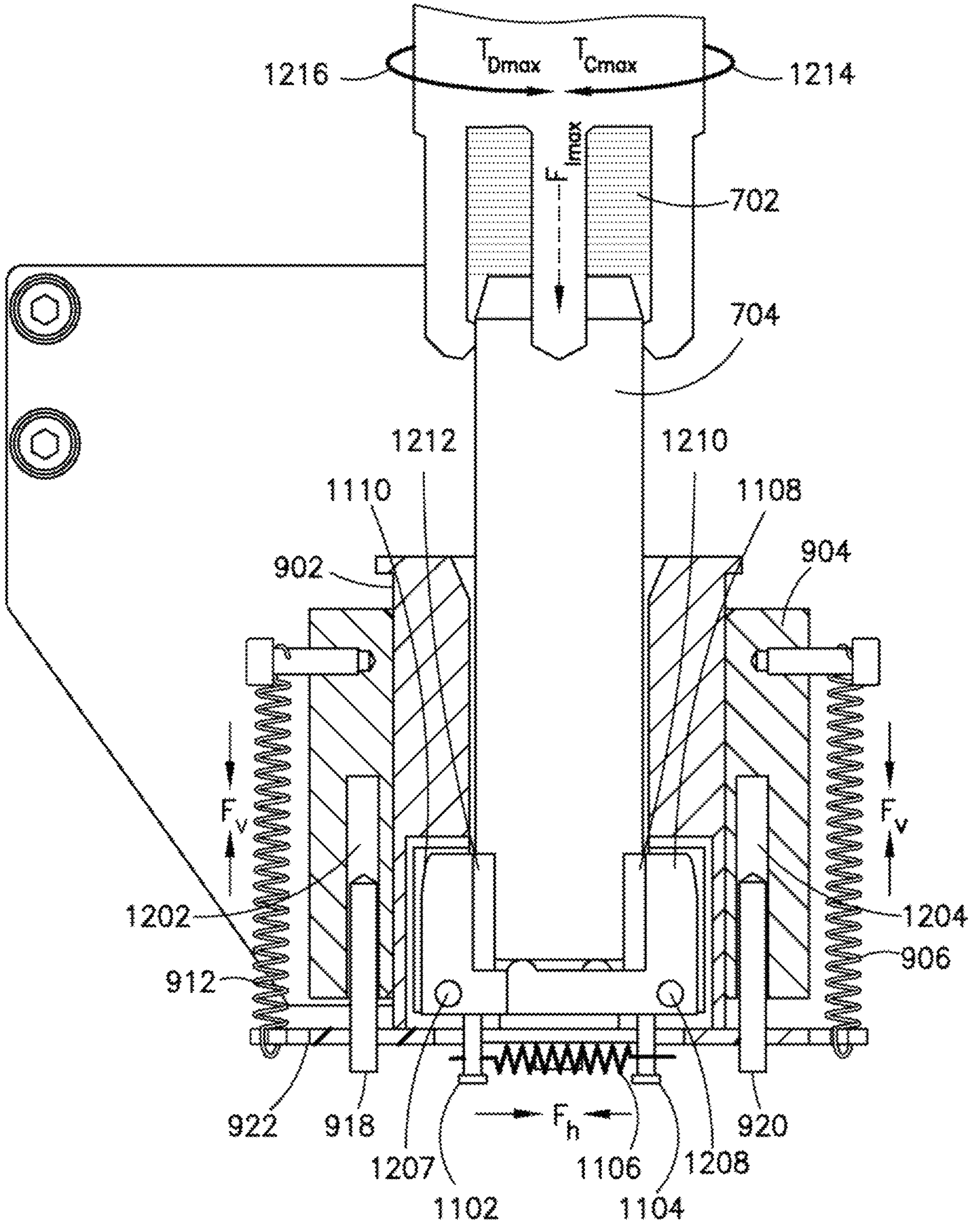
FIG. 12E is a front, cross-sectional view of the container restraint of FIG. 9 depicting a loaded/actuated/depressed state.

If additional gripping force is required, coupler assembly 108 can be advanced further downward with a force of $F_{Imax}$, where $F_{Imax}$ is greater than or equal to $F_{Inom}$, and greater than 2Fv (the cumulative biasing force exerted upon platform 922 by vertical springs 906 and 912). As shown in FIG. 12E the additional downward force $F_{Imax}$, causes container sleeve 902 to translate downward into exterior frame 904 as vertical springs 906 and 912 extend or stretch and platform 922 moves downward. Note the advancement of guide pins 918 and 920 in channels 1202 and 1204 away from the fully inserted position depicted in FIGS. 12A-D. This further advancement of coupler assembly 108 also causes pivoting levers 1108 and 1110 to assume fully engaged gripping positions, extending horizontal spring 1106 and bringing the upper vertical elements of the levers (and flexible friction pads 1210 and 1212) to more upright positions (illustrated as an essentially vertical position in FIG. 12E). In these positions the friction pads apply a static friction force of $F_s$ against the exterior of container 704.

When container 704 is fully engaged by friction pads 1210 and 1212, coupler assembly 108 can be rotated in a clockwise direction (1214) to cap the container, or in a counter-clockwise direction (1216) to decap the container. As previously discussed, the mating between the engagement splines 612 within coupling assembly 108 and the longitudinal channels 706 upon the container cap provides a secure interface enabling a significant torque to be applied to cap 702 by coupler assembly 108. The maximum torque to be applied in the clockwise direction ($T_{Cmax}$) or the counter-clockwise direction ($T_{Dmax}$) should be less than the static friction force ($F_s$) exerted against the exterior of container 704 to avoid slippage of the container body.

The system's ability to permit container sleeve 902 to translate downward into exterior frame 904 offers other advantages. For example, automated capping/decapping systems, such as the one described above, translate a vertical motion to the container/cap being fastened or unfastened. If the vertical position of the container being capped/decapped were held static, the automated system would have to continuously adjust its position throughout the capping/decapping process. This would likely require an increased level of both mechanical and control system complexity within automated system; both of which are undesirable. The vertical container position buffering afforded by the present invention permits such complexities to be avoided.

Figure 13A:
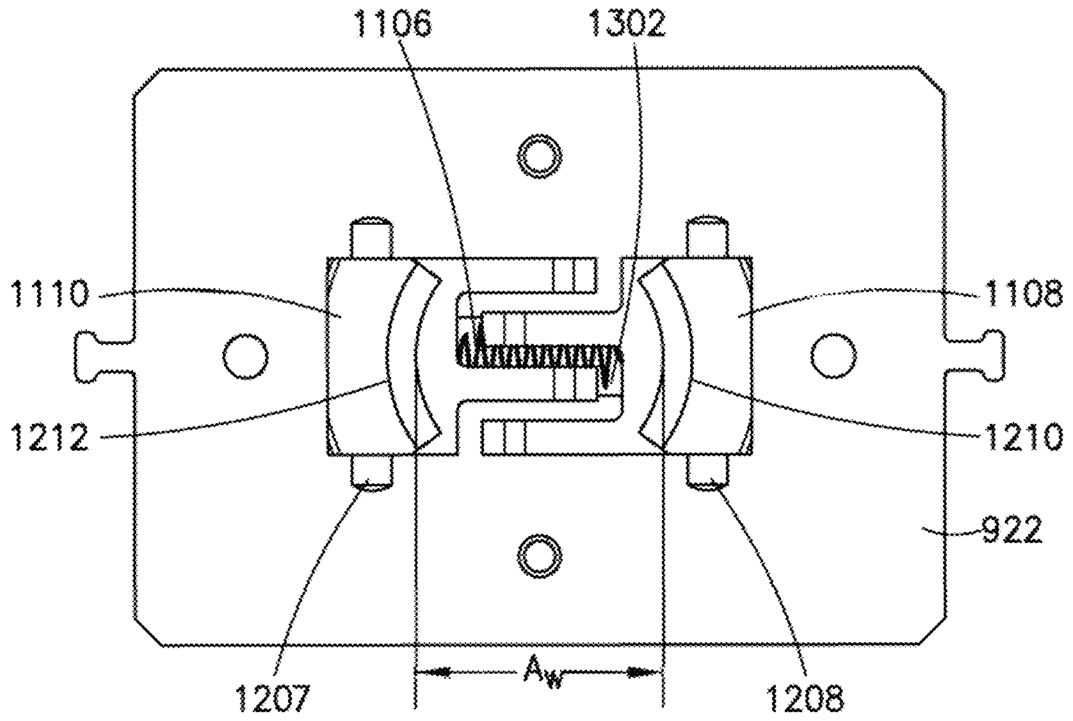
FIG. 13A is a top, partial cut-away view of the levers, pins and platform of the container restraint of FIG. 9 in a state to receive a container.

FIG. 13A provides a top, partial cut-away view of the levers 1108, 1110, pivot pins 1206 and platform 922 of container restraint 900 in a state ready to receive a container. In this state (also depicted in FIGS. 12A-C), horizontal spring 1106 biases the pivoting levers (1108, 1110) into a position where the lower horizontal element of each lever is rotated about its respective pivot pin so that the tip of the horizontal arm of each lever 1108, 1110 is maintained in an elevated posture within the central cavity 1206 of container sleeve 902. This force also causes the upper vertical arms of the respective levers 1108, 1110 to be in a position where the top of each is pointing upward and outward, away from the center of cavity 1206. Flexible friction pads (1210, 1212) are also pivoted outward, providing a widened aperture (Aw) for accepting the container as it is inserted into container sleeve 902 (see, e.g., FIG. 12A).

Figure 13B:
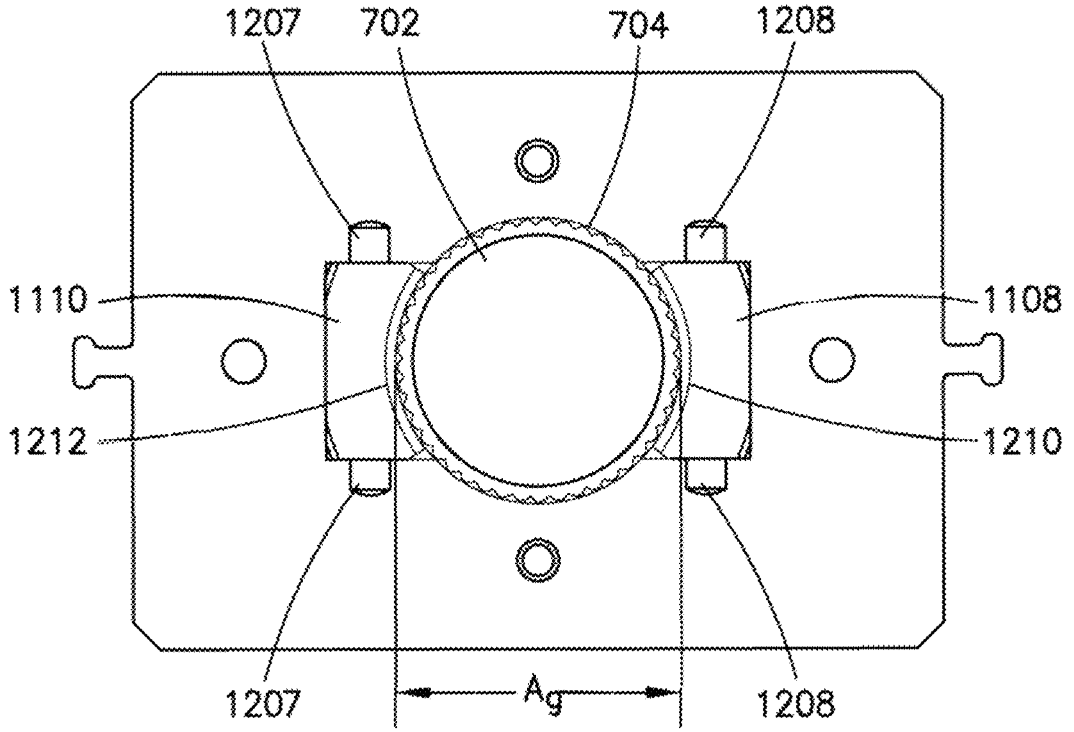
FIG. 13B is a top, partial cut-away view of the levers, pins, platform of the container restraint of FIG. 9 in full reception of a container.

FIG. 13B provides a top, partial cut-away view of the levers 1108, 1110, pivot pins 1206 and platform 922 of container restraint 900 in a state of gripping a container. As shown, when a container 704 is fully inserted into restraint 900, pivoting levers 1108 and 1110 assume fully engaged gripping positions, and horizontal spring 1106 is stretched in response to the downward force exerted on the levers 1108, 1110. This places the upper vertical arm of respective levers 1108 and 1110 to a more upright position (i.e. the position of the top portion of the vertical arm has advanced into the channel), and positions friction pads 1210 and 1212 firmly against the exterior of container 704. The distance separating the tops of the interior walls of the friction pads is reduced from Aw to $A_g$, where $A_g$ approximates the outside diameter of container 704 for securement thereof during capping/decapping. The levers 1108 and 1110 have dual horizontal elements, that define a gap 1302 therebetween, as can be seen in FIG. 13A. As illustrated in FIG. 13A, the dual horizontal elements of lever 1108 are interleaved with the dual horizontal elements of lever 1110.

Figure 14A:
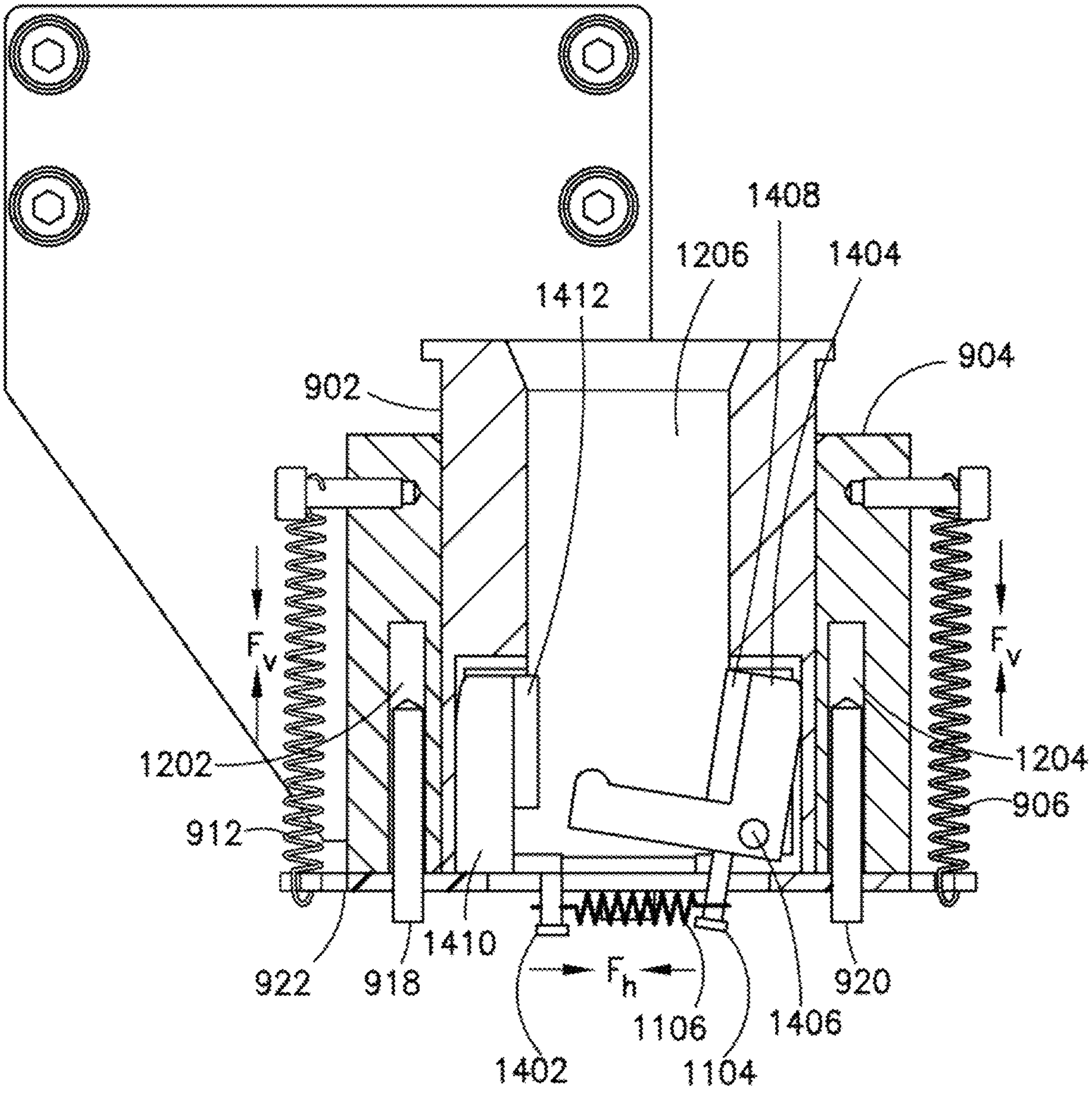
FIG. 14A is a front, cross-sectional view of a single-lever container restraint depicting an unloaded/unactuated state.

FIGS. 14A-E provide cross-sectional views of an alternate embodiment of a container restraint in accordance with the invention. In particular, FIG. 14A depicts a single-lever container restraint prior to the insertion or loading of any container. Unlike the previously described embodiment, this particular embodiment employs only one pivoting L-shaped lever and a static gripper wall to effectively constrain container. This embodiment is illustrated with vertical springs 906 and 912 as biasing elements for the platform 922. This embodiment is also illustrated with spring 1106 as a biasing element for the single lever 1404. However alternative embodiments with different or no separate biasing elements are contemplated herein. For example, and embodiment with no bias applied to platform 922 and a bias intrinsic to lever 1404 is contemplated. An example of an intrinsic bias to lever 14 might be a bias applied to pivot or pin 1406 for example, such bias being overcome by the downward force applied to the container 1206.

Figure 15A:
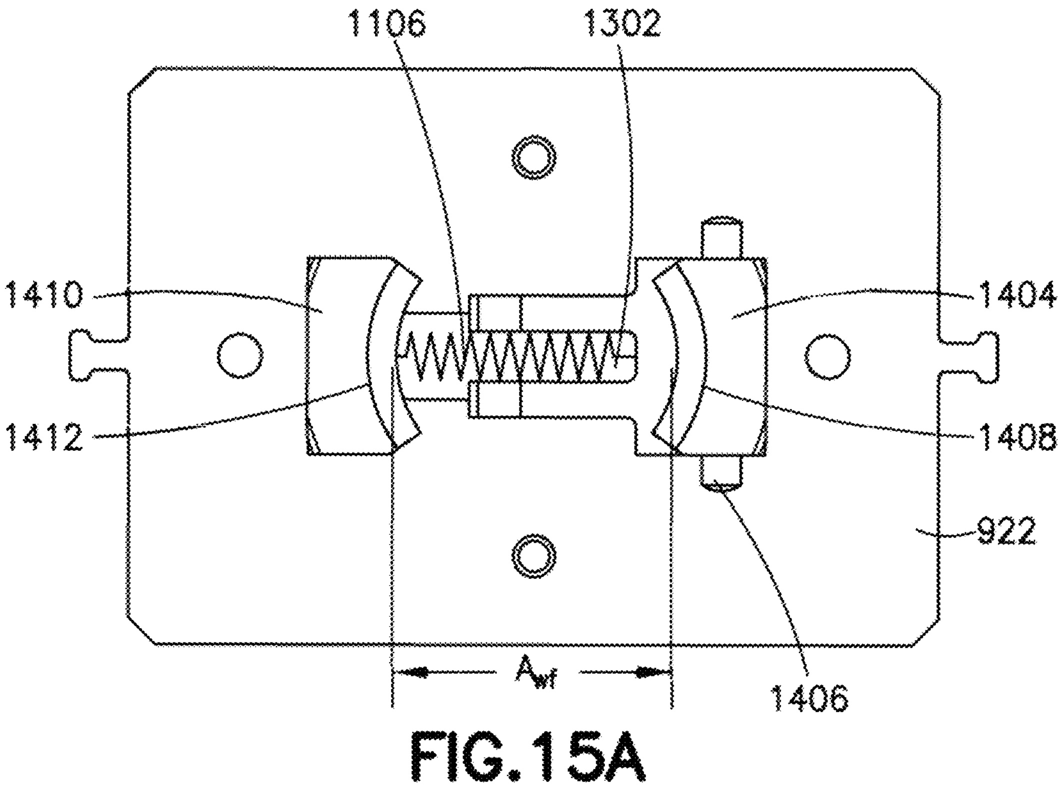
FIG. 15A is a top, partial cut-away view of the lever, pin and platform of a single-lever container restraint in a state to receive a container.

As shown in FIG. 14A, the vertical springs 906 and 912 serve to bias platform 922 against the lower surface of exterior frame 904 with a pull-up force of $2F_v$. Guide pins 918 and 920 are shown to be fully inserted within guide channels 1202 and 1204, respectively. Horizontal spring 1106 is shown to bias horizontal spring anchor 1104 inward toward fixed horizontal spring pin 1402 with a force of $F_h$. This inward biasing force must be great enough to cause pivotally-mounted lever 1404 to pivot about pin 1406, and less than the nominal downward force, $F_{Inom}$, that will be exerted upon a container by an automated (or manual) system during insertion into the container restraint, and the subsequent capping or decapping. The biased pivoting places this lever 1404 in a position suitable for accepting the loading of a container 704. The lever 1404 has dual lower horizontal elements and an upper vertical element. The dual horizontal elements of lever 1404 are illustrated in FIG. 15A, for example. In the loading position, the lever 1404 is rotated so that the tip of each horizontal element (only the front element is seen from this view) is placed in an elevated posture within the central cavity 1406 of container sleeve 902. Consequently, this rotation places the upper vertical element of the lever 1404 in a position where the top is moved outward, away from the center of cavity 1406. The interior surface of the upper vertical element is contoured to conform to the radial cross-sectional shape of the body of the type of container that is to be constrained (a circular cross-section in this embodiment), and a flexible friction pad (1408) is affixed to conform to the face of each interior surface. This pad may be comprised of rubber, a synthetic polymer material, or other suitable material that will serve to provide a cumulative static friction force of $F_s$ when engaged against the exterior of the container. The pad must have a suitable size to provide the target cumulative static friction force.

A fixed wall 1410 is positioned within central cavity 1206, opposite the vertical element of pivotally-mounted lever 1404. The interior surface of fixed wall 1410 is contoured to conform to the radial cross-sectional shape of the body of the type of container that is to be constrained (a circular cross-section in this embodiment), and a flexible friction pad (1412), similar in composition and function to pad 1408, is affixed to conform to the face the wall's interior surface.

Figure 14B:
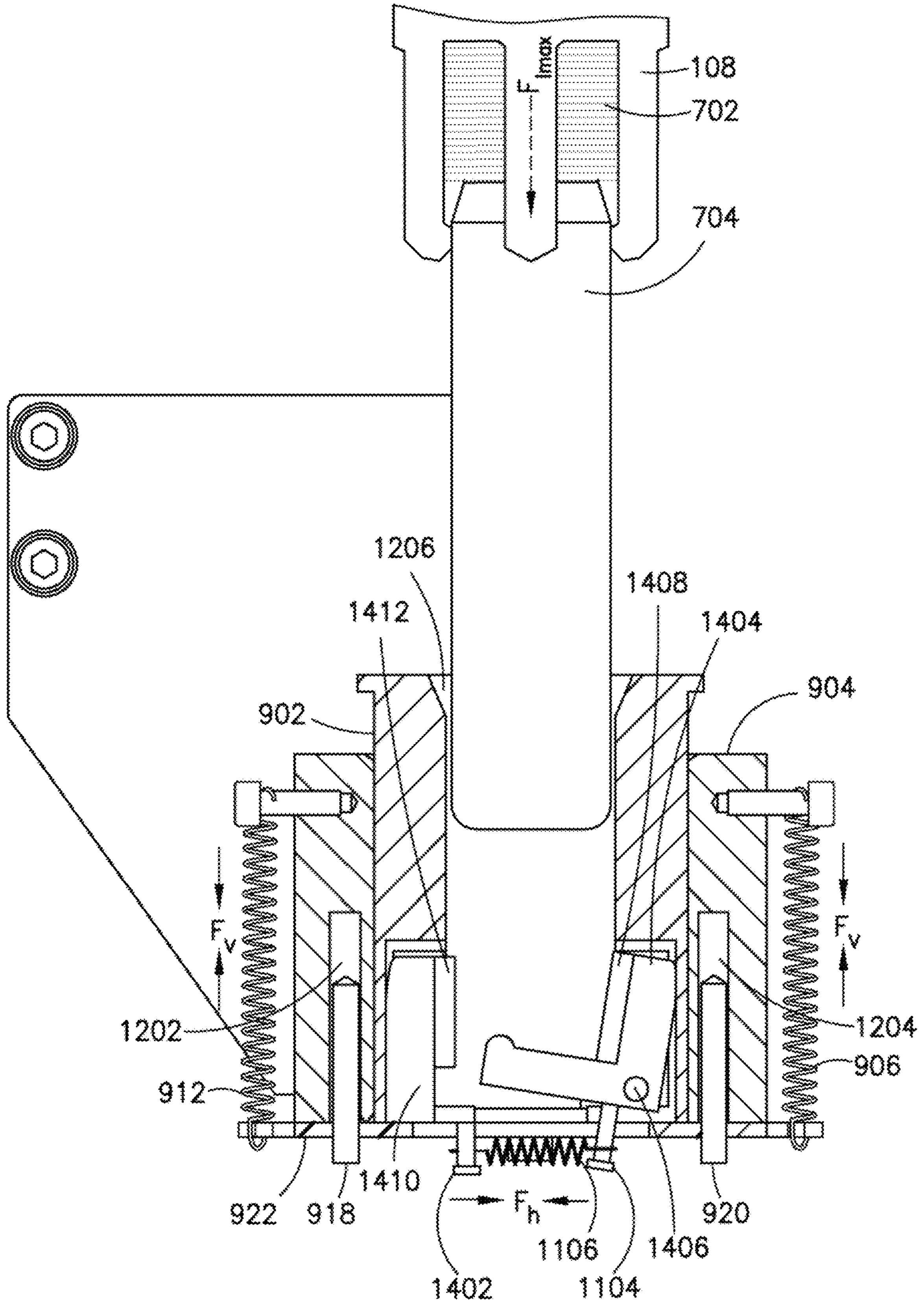
FIG. 14B is a front, cross-sectional view of a single-lever container restraint depicting a partially-loaded/unactuated/undepressed state.
Figure 14C:
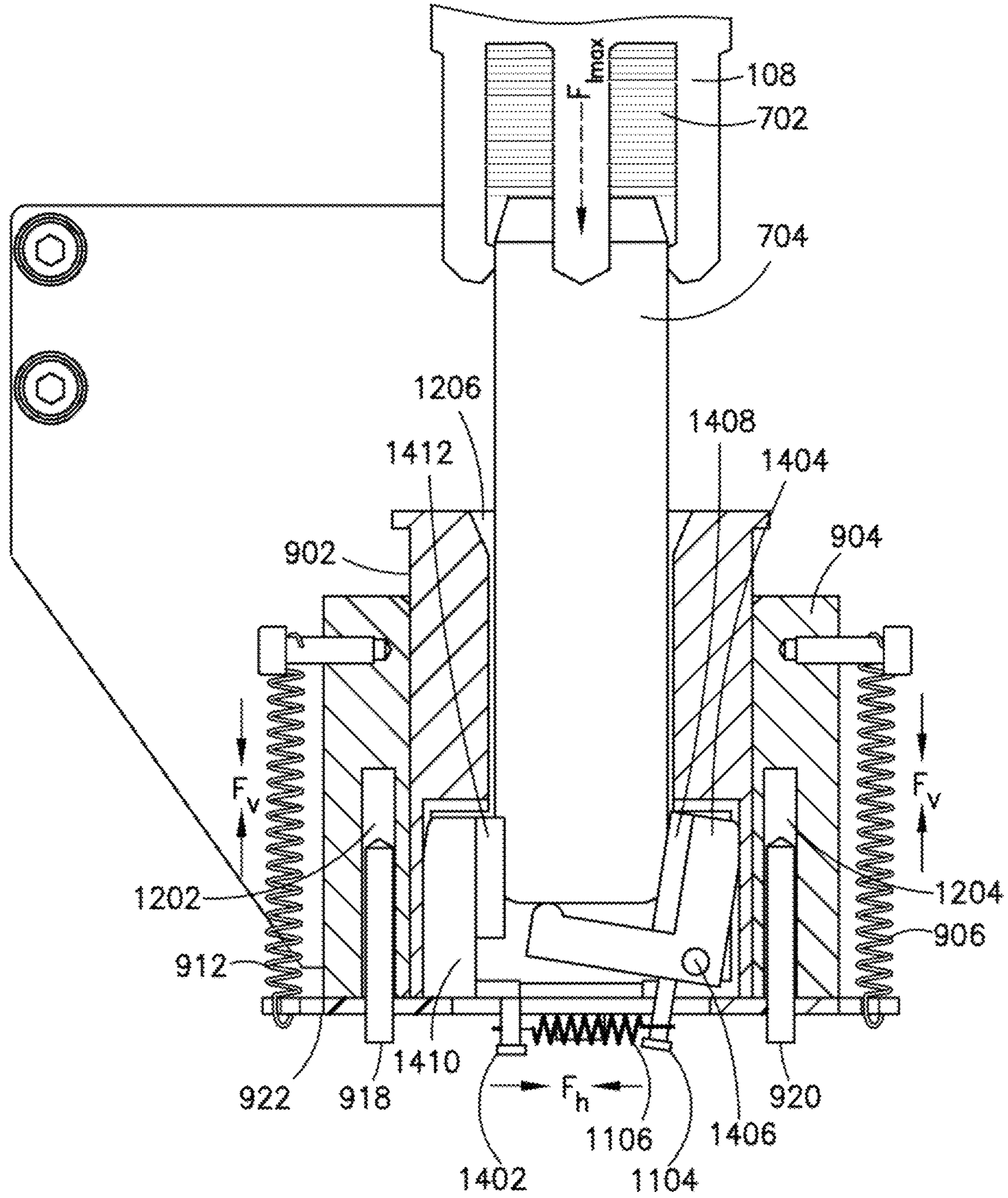
FIG. 14C is a front, cross-sectional view of a single-lever container restraint depicting a loaded/unactuated/undepressed state.

FIG. 14B shows coupler assembly 108 gripping container 704 as it inserts the container into central cavity 1406 of container sleeve 902. A nominal insertion force, $F_{Inom}$, is exerted by coupler assembly 108 as the container is moved downward into central cavity 1206. At this point of the insertion process, the container has not engaged pivotally-mounted lever 1404. Vertical springs 906 and 912 remain in their initial, resting positions. Horizontal spring 1106 maintains inward force $F_h$ between horizontal spring anchor 1104 and fixed horizontal spring pin 1402, thereby causing pivotally-mounted lever 1404 to remain in a position suitable for accepting the loading of a container. In FIG. 14C the container has been brought into contact with the elevated tip of each lower horizontal element of pivotally-mounted lever 1404. The container has yet to be advanced into the central cavity to a point where it begins to depress the elevated tip of the lever's horizontal element. As in FIG. 14A, vertical springs 906 and 912 remain in their initial, resting positions. Horizontal spring 1106 maintains inward force $F_h$, and pivotally-mounted lever 1404 remains in a position suitable for accepting the loading of a container.

Figure 14D:
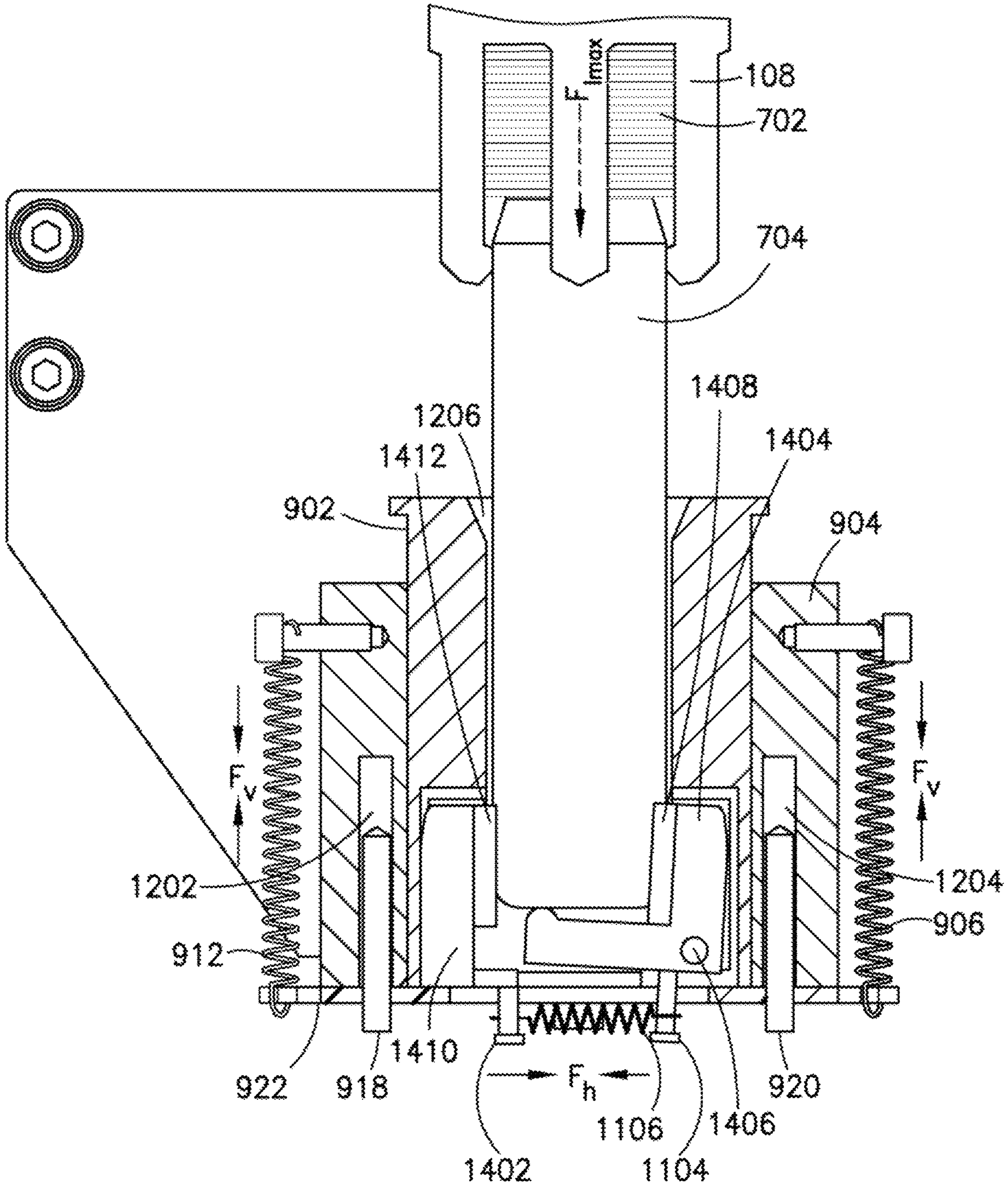
FIG. 14D is a front, cross-sectional view of a single-lever container restraint depicting a loaded/actuated/undepressed state.

FIG. 14D provides an illustration of the further advancement of container 704 into container 902 by coupler assembly 108. At this juncture, force $F_{Inom}$ is fully exerted upon the elevated tips of the lever's horizontal elements. This force ($F_{Inom}$), being greater than force $F_h$ exerted upon horizontal spring anchors 1102 and 1104 and the associated pivotally-mounted levers (1108, 1110), causes horizontal spring 1106 to extend or stretch as the elevated tips of the lever's horizontal elements are forced downward, and the top portion of the upper vertical element of the lever is brought inward toward the center of cavity 1206. This inward motion causes flexible friction pads (1408, 1412) to engage and grip the exterior of container 704.

Figure 14E:
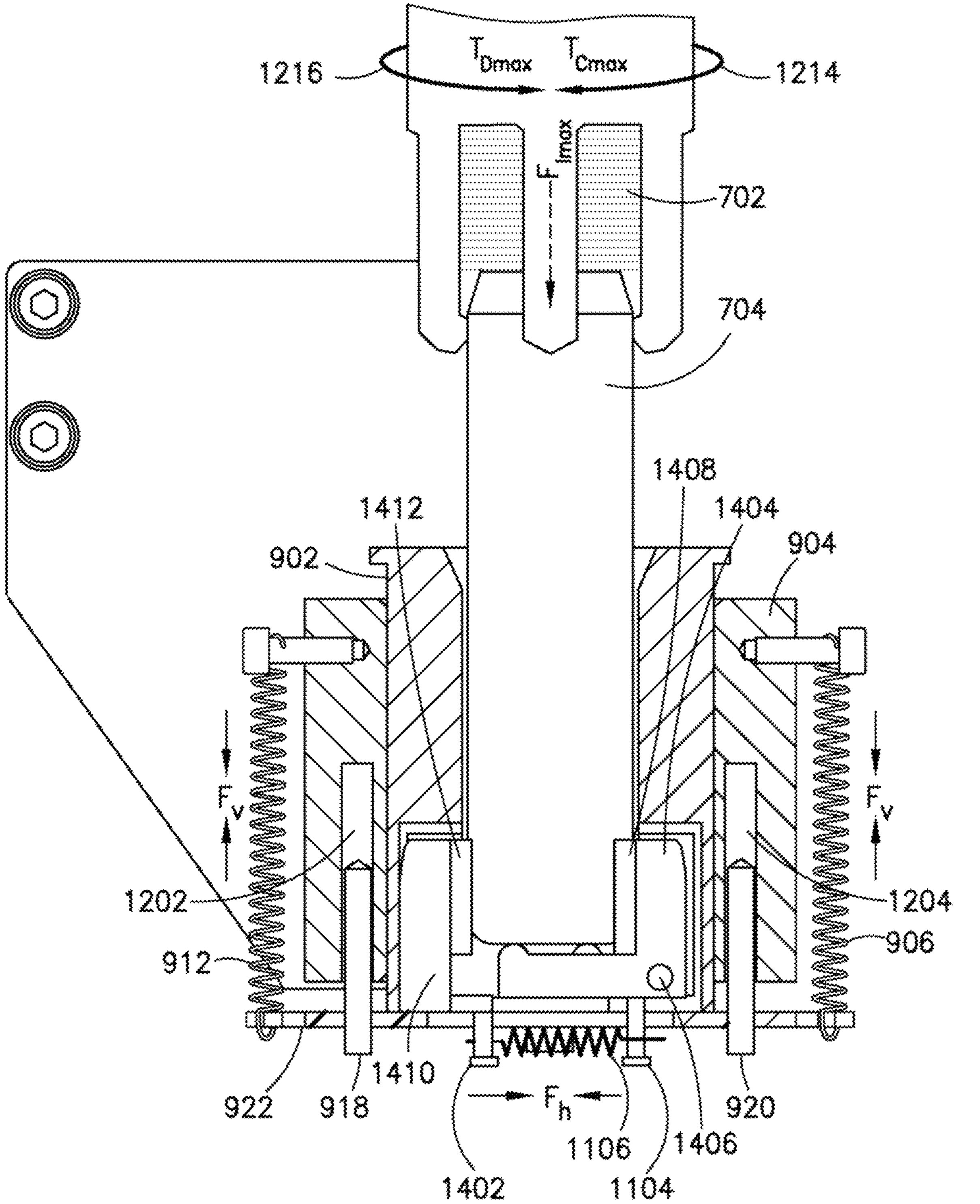
FIG. 14E is a front, cross-sectional view of a single-lever container restraint depicting a loaded/actuated/depressed state.

If additional gripping force is required, coupler assembly 108 can be advanced further downward with a force of $F_{Imax}$, where $F_{Imax}$ is greater than or equal to $F_{Inom}$, and greater than 2Fv (the cumulative biasing force exerted upon platform 922 by vertical springs 906 and 912). As shown in FIG. 14E the additional downward force $F_{Imax}$, causes container sleeve 902 to translate downward into exterior frame 904 as vertical springs 906 and 912 extend or stretch and platform 922 moves downward. Note the advancement of guide pins 918 and 920 in channels 1202 and 1204 away from the fully inserted position depicted in FIGS. 14A-D. This further advancement of coupler assembly 108 also causes pivoting lever 1404 to assume a fully engaged gripping position, extending horizontal spring 1106 and bringing the upper vertical element of the lever (and flexible friction pad 1408) to a more upright position (illustrated as an essentially vertical position in FIG. 14E). In this position friction pads 1408 and 1412 (the fixed pad) apply a static friction force of $F_{sf}$ against the exterior of container 704.

When container 704 is fully engaged by friction pads 1408 and 1412, coupler assembly 108 can be rotated in a clockwise direction (1214) to cap the container, or in a counter-clockwise direction (1216) to decap the container. As previously discussed, the mating between the engagement splines 612 within coupling assembly 108 and the longitudinal channels 706 upon the container cap provides a secure interface enabling a significant torque to be applied to cap 702 by coupler assembly 108. The maximum torque to be applied in the clockwise direction ($T_{Cmax}$) or the counter-clockwise direction ($T_{Dmax}$) should be less than the static friction force ($F_{sf}$) exerted against the exterior of container 704 to avoid slippage of the container body.

The single lever embodiment's ability to permit container sleeve 902 to translate downward into exterior frame 904 offers the same advantages as those described above for the multiple lever embodiment. For example, automated capping/decapping systems, such as the one described above, translate a vertical motion to the container/cap being fastened or unfastened. If the vertical position of the container being capped/decapped were held static, the automated system would have to continuously adjust its position throughout the capping/decapping process. This would likely require an increased level of both mechanical and control system complexity within automated system; both of which are undesirable. The vertical container position buffering afforded by the present invention permits such complexities to be avoided.

FIG. 15A provides a top, partial cut-away view of lever 1404, pivot pin 1406, fixed wall 1410, and platform 922 of the single-lever container restraint a state ready to receive a container. In this state (also depicted in FIGS. 14A-C), horizontal spring 1106 biases pivoting lever 1404 into a position where the lower horizontal elements are rotated about pivot pin 1406 so that the tip of each horizontal element is maintained in an elevated posture within the central cavity 1206 of container sleeve 902. This force also causes the upper vertical arm of lever 1404 to be in a position where the top is pointing upward and outward, away from the center of cavity 1206. Flexible friction pad 1408 is also pivoted outward, providing a widened aperture ($A_{wf}$) for accepting the container as it is inserted into container sleeve 902 (see, e.g., FIG. 14A).

Figure 15B:
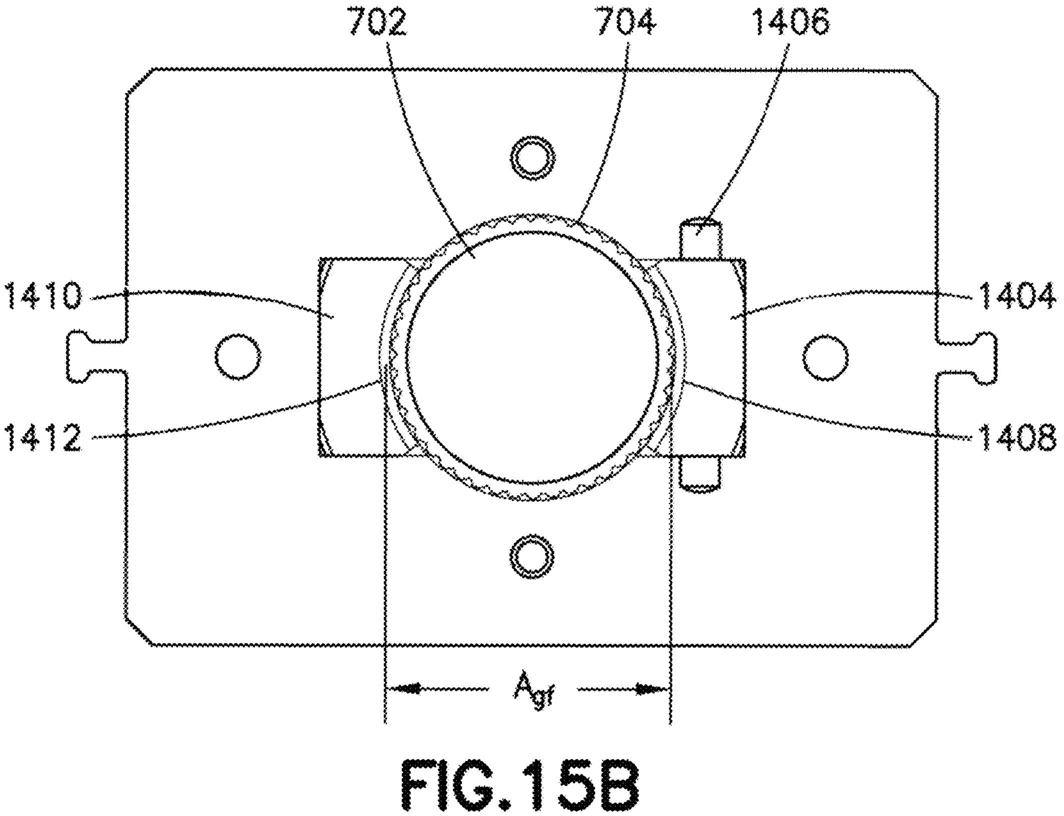
FIG. 15B is a top, partial cut-away view of the lever, pin, platform of a single-lever container restraint in full reception of a container.

FIG. 15B provides a top, partial cut-away view of the lever 1404, pivot pin 1406, fixed wall 1410, and platform 922 of the single-lever container restraint in a state of gripping a container. As shown, when container 704 is fully inserted into the restraint, pivoting lever 1404 assumes a fully engaged gripping position, and horizontal spring 1106 is stretched in response to the downward force exerted on the lever. This places the upper vertical arm of the levers into a more upright position (i.e. the position of the top portion of the vertical arm has advanced into the channel), and position friction pad 1408 firmly against the exterior of container 704. The distance separating the top of the interior walls of the lever mounted friction pad and the interior surface of the friction pad (1412) mounted upon fixed wall 1410 is reduced from $A_{wf}$ to $A_{gf}$, where $A_{gf}$ approximates the outside diameter of container 704 for securement thereof during capping/decapping.

Figure 16:
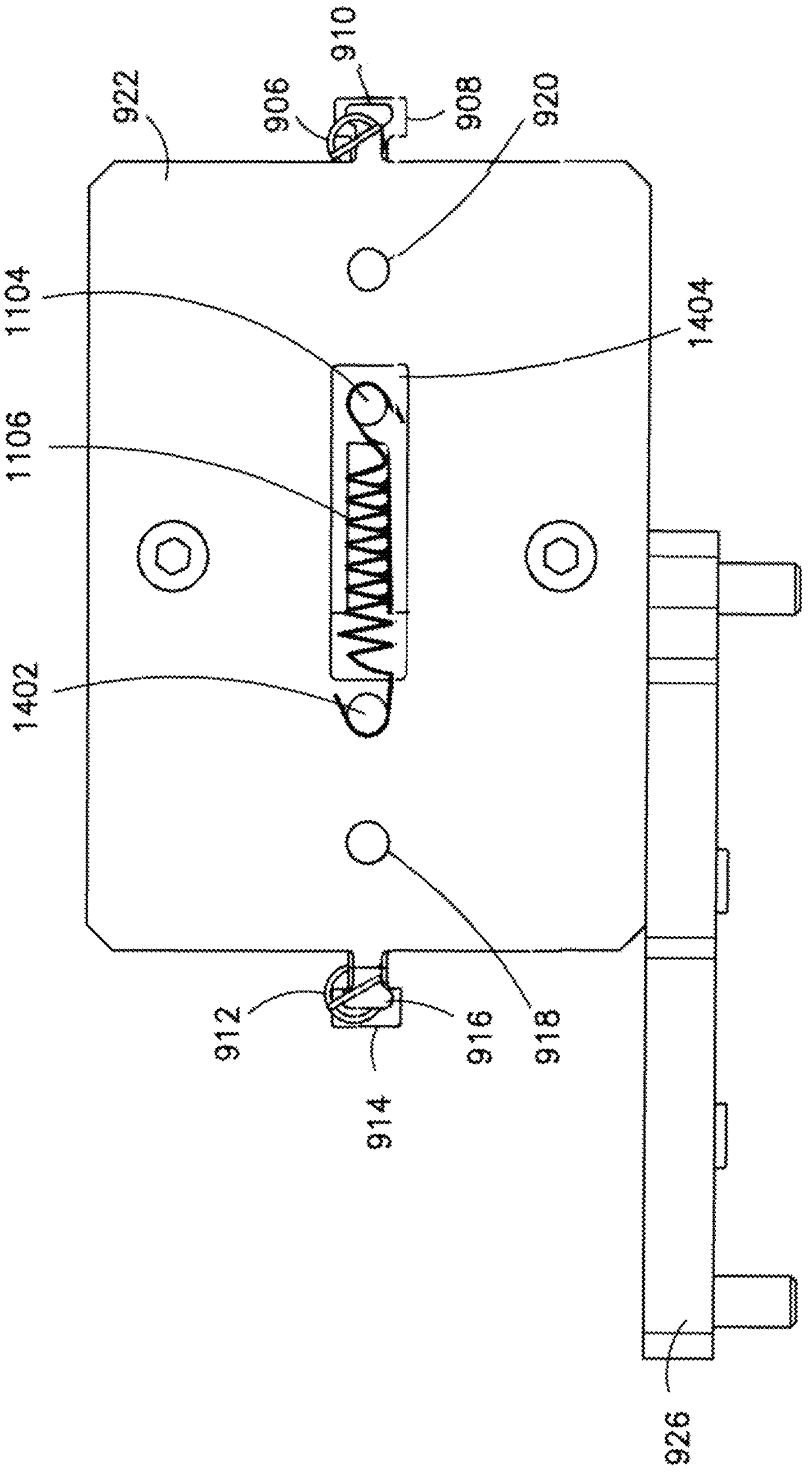
FIG. 16 is a bottom view of a single-lever container restraint.

FIG. 16 provides a bottom view of the single-lever embodiment of the apparatus described herein. A portion of lever 1404 is visible through the rectangular void in platform 922. Horizontal spring 1106 is shown to bias horizontal spring anchor 1104 inward toward fixed horizontal spring pin 1402.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An automated system for mechanically capping and decapping a container, the system comprising:

a mechanical cap gripper assembly comprising:

an ejector operatively coupled to an impeller, both of which are concentrically positioned about a rotatable threaded drive shaft, wherein the impeller rotates in response to rotation of the threaded drive shaft;

a coupler assembly operatively engaged with the ejector wherein the ejector comprises a plurality of ejection rods and wherein the impeller translates along the threaded shaft to allow the ejector to move from a first position where each of the plurality of ejection rods are retracted from the coupler assembly to a second position where each of the plurality of ejector rods are advanced into the coupler assembly, wherein the coupler assembly further comprises a plurality of fingers, each of which receives a biased engagement spline wherein the engagement splines are in a gripping position when the ejector is in the first position;

wherein the mechanical cap gripper assembly operates to cap and decap a container held in container constraining assembly comprising a block having a proximal and a distal end with a channel therein from the proximal end to the distal end, the channel adapted to receive the container from the proximal end in the block, the channel having a length such that a portion of the container that receives the cap does not enter the channel;

at least one lever positioned proximate to a distal end of the channel in the block wherein the at least one lever is pivotally attached to the block and wherein the lever has a radial portion that extends substantially radially with respect to the channel and an axial portion that extends substantially axially relative to the channel and wherein the radial portion and the axial portion of the lever rotate with respect to an axis defined by the pivotal attachment of the lever to the block wherein the at least one lever is mechanically biased with a first biasing force such that the radial portion of the at least one lever extends inwardly and upwardly into the channel and the axial portion of the at least one lever extends upwardly and outwardly with respect to a channel axis; and wherein, in response to a downward force exerted by the container in the channel that exceeds the mechanical bias of the at least one lever, the lever pivots at a proximal end of the radial portion and axial portions of the lever such that a distal end of the radial portion is urged downward in response to the downward force exerted on the container received by the channel and the distal end of the axial portion is urged toward the container in the channel such that the distal end of the axial portion contacts the container with a static friction force ($F_s$).

2. The automated system of claim 1, wherein the ejector comprises an ejector sensor that detects translation of the ejector along a longitudinal axis of the threaded shaft.

3. The automated system of claim 2, wherein the ejector sensor is an inductive proximity sensor.

4. The automated systems of claim 3, wherein the inductive proximity sensor detects proximity of the ejector to the coupler assembly.

5. The automated system of claim 1, wherein the impeller comprises an impeller sensor that detects an uppermost position of the impeller along the threaded shaft.

6. The automated system of claim 5, wherein the impeller sensor is an optical fork sensor.

7. The automated system of claim 1, wherein the coupler comprises a coupler sensor for detecting coupler rotation.

8. The automated system of claim 7, wherein the coupler sensor is an optical fork sensor.

9. The automated system of claim 1, wherein the coupler assembly comprises three fingers, wherein the three fingers are sized to receive the container cap and three circular channels, each of which is sized and positioned to receive a one of the plurality of ejection rods.

10. The automated system of claim 9, wherein each of the three fingers comprises a tapered, trapezoidal cross-section that terminates at a prismatic quadrilateral tip and a chamber that receives an engagement spline.

11. The automated system of claim 10, wherein a base of the engagement spline is retained in the tip of the finger, and wherein a top of the engagement spline is biased inward against an inner wall of the chamber.

12. The automated system of claim 11, wherein the engagement splines do not grip the cap when each of the plurality of ejection rods are in the first position.

13. The automated system of claim 12, wherein the ejector comprises three ejector rods.

14. The automated system of claim 13, wherein the ejector further comprises a central unthreaded channel.

15. The automated system of claim 1, wherein the impeller and ejector are moveably disposed in a frame wherein a largest radius of the impeller is less than an inner radius of the frame, thereby defining a gap between the impeller an inner wall of the frame.

16. The automated system of claim 15, further comprising an impeller alignment shaft positioned on the inner wall of the frame, where the impeller alignment shaft is positioned in the gap between the impeller an inner wall of the frame, wherein the impeller and the ejector freely translate along the threaded drive shaft unimpeded by the impeller alignment shaft.

17. The automated system of claim 16, wherein there is a gap between the ejector and the impeller alignment shaft.

18. The automated system of claim 15, the frame comprising a first window and an impeller sensor is positioned in the first window.

19. The automated system of claim 18, the frame comprising a second window and a coupler sensor is positioned on the second window.

20. The automated system of claim 19, further comprising an ejector sensor mounted through the frame.

* * * * *